United States Patent [19]

Holy

[11] 4,071,899
[45] Jan. 31, 1978

[54] SYSTEM AND METHOD FOR THE MEASUREMENT OF REPETITIVE PATTERNS

[75] Inventor: Josef K. Holy, Carlsbad, Calif.

[73] Assignee: Hughes Aircraft Company, Culver City, Calif.

[21] Appl. No.: 704,191

[22] Filed: July 9, 1976

[51] Int. Cl.[2] ..................... G01N 21/32; G06F 15/34; G06F 15/46

[52] U.S. Cl. ..................................... 364/561; 83/365; 83/371; 250/559; 250/563; 356/200; 364/475; 364/728

[58] Field of Search .................. 235/151, 151.1; 444/1; 356/199, 200; 83/71, 74, 365, 369, 371; 219/121 L; 250/571, 572, 562, 563, 559, 548; 340/172.5

[56] References Cited

U.S. PATENT DOCUMENTS

| | | | |
|---|---|---|---|
| 3,039,687 | 6/1962 | Chope | 235/181 |
| 3,432,674 | 3/1969 | Hobrough | 340/146.3 Q |
| 3,576,534 | 4/1971 | Steinberger | 340/146.3 Q |
| 3,803,960 | 4/1974 | Pearl et al. | 83/71 |
| 3,835,332 | 9/1974 | Bridges | 356/200 |
| 3,838,618 | 10/1974 | Eissfeldt et al. | 83/365 |
| 3,848,490 | 11/1974 | Arel | 83/71 |

*Primary Examiner*—Felix D. Gruber
*Attorney, Agent, or Firm*—Lawrence V. Link, Jr.; W. H. MacAllister

[57] ABSTRACT

In accordance with one embodiment of the invention, the repetitive bar pattern of plaid material is sampled along the length of the goods by means of light reflected therefrom and auto- and cross-correlation functions of groups of said signals are computed so as to define the pattern of the transverse bars of the plaid. This measured pattern is used within a computer-controlled system for cutting the component pieces of clothing items so as to compensate for nonuniformities or distortions in the bar pattern of the material.

19 Claims, 32 Drawing Figures

Fig. 8a.
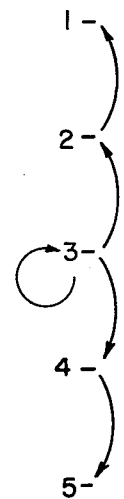
Fig. 8b.
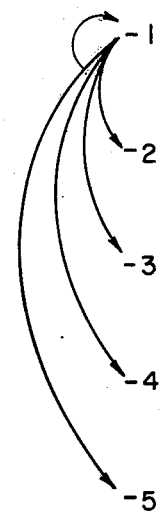
Fig. 8c.
Fig. 9.
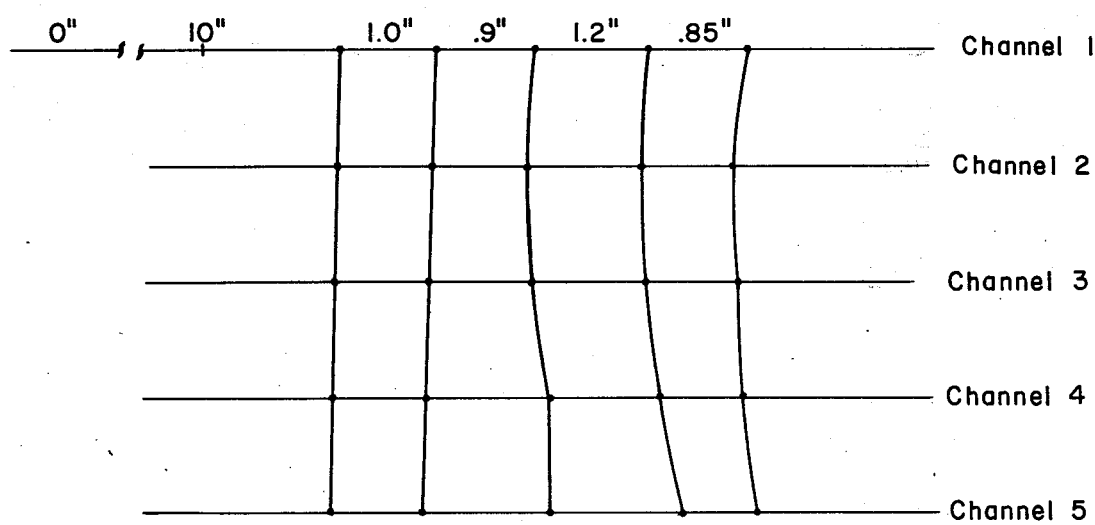

Fig. 16.
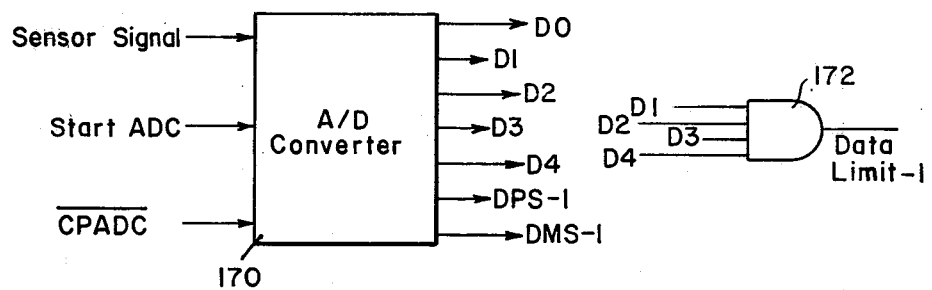
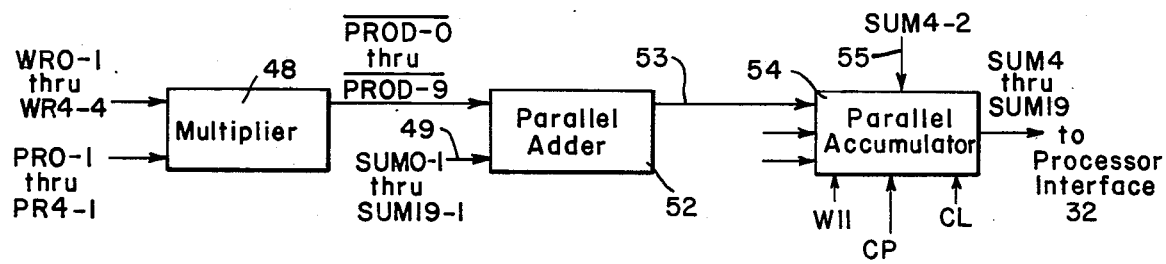
Fig. 21a.
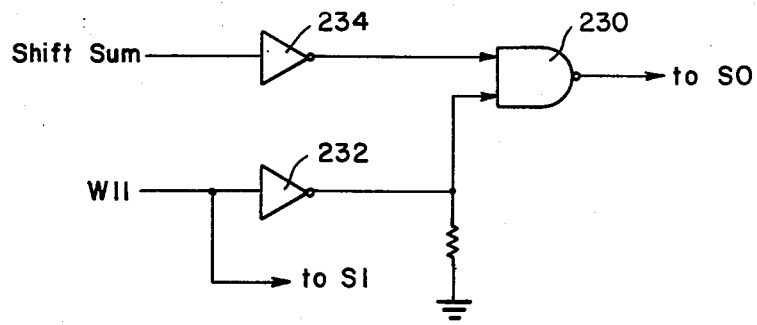
Fig. 21b.

SYSTEM AND METHOD FOR THE MEASUREMENT OF REPETITIVE PATTERNS

BACKGROUND OF THE INVENTION

This invention relates to pattern recognition systems in general and more particularly to plaid measuring systems.

Computer-controlled systems for automatically cutting the component pieces of clothing items are now in use in the apparel industry. In such systems the computer directs a cutting tool, such as the laser beam, reciprocating blade or fluid jet, for example, according to instructions prepared from a cutting plan. The advantages of such systems include reduced cutting cost, improved material utilization, and the elimination of the need for paper markers.

Pattern goods are of two types, i.e. stripes or plaids. Stripes are defined as goods which have a one-dimensional effect, generally confined to the direction along the bolt of cloth. In finished suits, for example, the stripes generally run from "head to toe" and stripe "matches" are usually limited to coat parts. The geometric uniformity of stripe pattern goods is usually quite good. On the other hand, plaid pattern goods are two-dimensional in nature with the stripe pattern along the length of the bolt and the line or bar pattern transverse to the length of the bolt. In finished suits, for example, the parts are matched in both stripe and bar dimensions. In plaid material, stripe uniformity is usually good but the bars are subject to manufacturing errors, and material (thread) variations, resulting in bar pattern distortion.

Heretofore, only plain or striped materials could be cut by computer-controlled systems and this is a costly limitation to manufacturers whose product line may be as much as 90% plaid goods. Manual control of plaid cutting requires a very high degree of operator skill as well as extra operational steps such as blocking and recutting.

In prior art systems for automatically cutting stripe goods, the bolt of material is placed in an automatic spreader located in front of a conveyor; an electronic stripe follower is "locked on" a selected center stripe and by closed loop "servo" control the material is placed on the moving conveyor belt in a straight line. Because only a few parts, such as a coat, have to be stripe matched, and since the stripe geometry is predictable, there is no need for pattern shifting and the "cut pattern" for the computer may be prepared beforehand.

Automated cutting of plaid materials presents a number of problems which result from the facts that:
 plaid suits must match in both the stripe and bar directions, i.e. two-dimensional matching;
 plaid designs vary in geometry; and
 plaid goods are distorted, the distortion is unpredictable and it varies as a function of handling, inspection, spreading of the material, etc.

If the plaid pattern repetition frequency, i.e. the separation between transverse bars, was constant and if the bars were not skewed, bowed or otherwise distorted, a computer could readily be programmed so that the individual parts are properly oriented on the plaid material to assure required match. Unfortunately, the repetition frequency of the transverse bars in plaid material is not stable nor are the bars straight, and a significant aspect of the subject invention deals with the resolution of these problems which heretofore have prohibited the automatic cutting of plaid material.

SUMMARY OF THE INVENTION

It is therefore a primary object of the subject invention to provide new and useful methods and systems for measuring the transverse grid pattern of plaid materials.

A further object is to provide an on-line system for measuring the interval between and the slope of the transverse bars of plaid material.

Another object of the invention is to provide automatic plaid measuring systems wherein the measurement is made by means of correlating signals indicative of the bar pattern of contiguous (including overlapping) segments along the length of the plaid goods.

Still a further object is to provide a plaid measuring system wherein the measurements are computed by means of correlation functions of position samples taken along the length of the plaid goods, whereby the position sampling makes the system substantially independent of the relative velocity of the goods through the system.

A more detailed object is to provide a stable and reliable plaid measuring system wherein the plaid measurement is performed by means of correlation functions of sampled signals whose center value is automatically adjusted so that the signals are centered within the optimum acquisition region of the system's A/D converter.

One example of an application for a plaid measuring system would be an automatic "one-high" cutter system in which the cutting control computer is programmed for cutting a given undistorted plaid. An "on-line" plaid measuring system in accordance with the subject invention generates data indicative of the distortion in the particular piece of goods to be cut. This data is used by the cutting control computer to modify the original cut data so that the proper alignment of stripes and bars is maintained in the finished garment despite distortion of the plaid material.

To accommodate the just described "correcting displacement" of the various pieces, in the basic cut program extra room is provided around each part requiring a match to allow for the maximum expected value of distortion of the plaid material. The cutting control computer relocates the pieces, within the respective safe borders, in accordance with the data provided from the "on-line" plaid measuring system of the subject invention.

In accordance with one preferred embodiment of the invention, the plaid material is deposited on the moving surface of a suitable conveyor by means of a standard spreading device equipped with a stripe follower, i.e. a closed loop servo system which "locks-on" to a particular stripe in the plaid goods and positions the goods so that the particular stripe is maintained at a fixed longitudinal position on the conveyor. The plaid measuring system is located "upstream" a specific distance from a reference point on the cutting station. The system includes sensors and light sources mounted along a support structure straddling the conveyor. The focused sensors are positioned for receiving light reflected from the plaid material as it is moved under the sensors. Each light source and its associated sensor are part of one processing channel, which correlates data sampled in a given width segment along the length of the material. Typically about five to seven sensors are adequate for ordinary plaid goods used in the apparel industry.

The signals produced by the sensors are applied to a correlation signal processor which generates auto-correlation and cross-correlation functions of the input signals. The auto-correlation functions are produced when sampled data of one processing channel is correlated with data subsequently sampled by the same channel. The cross-correlation function results when sampled data of one processing channel is correlated with data subsequently sampled in another channel. The peaks of the auto-correlation signals are indicative of the distance between corresponding points within each of the repetitive bar patterns along the length of the plaid goods. The peaks in the cross-correlation functions represent the slope of the plaid bars, e.g. their deviation from a position orthogonal to the length of the goods. The correlation data from all of the processing channels is indicative of the distortion of the transverse plaid bars.

The correlation functions are generated by means of position sampling instead of conventional time sampling. This makes the system independent of conveyor speed variation and assures that the system does not lose synchronization during stops. By way of contrast, a time sampling method would produce valid data only after the conveyor has reached constant velocity, i.e. after the acceleration and before deceleration takes place. Also, a time sampling implementation would have long data gaps and conveyor speed variations would reduce measurement accuracy.

In the herein disclosed embodiment of the invention, the center value of the sampled signals is automatically adjusted to stay within the optimum acquisition region of the system's A/D converter.

BRIEF DESCRIPTION OF THE DRAWINGS

The novel features of the subject invention, as well as the invention itself, and the objects and advantages thereof will be better understood from the accompanying description taken in conjunction with the accompanying drawings in which:

FIGS. 8a, 8b and 8c are diagrams useful for explaining the functional relationship between the auto-correlation channels and the cross-correlation channels of processor 30 of FIG. 1;

FIG. 9 depicts the transverse bar pattern of the plaid material as measured by the system of the subject invention;

FIG. 16 is a block diagram of a portion of the detector electronics unit 23 of FIG. 1;

FIGS. 19, 20, 21a and 21b are block and schematic diagrams of the correlation processor of FIG. 1;

DETAILED DESCRIPTION OF THE PREFERRED EMBODIMENT

Figure 1:
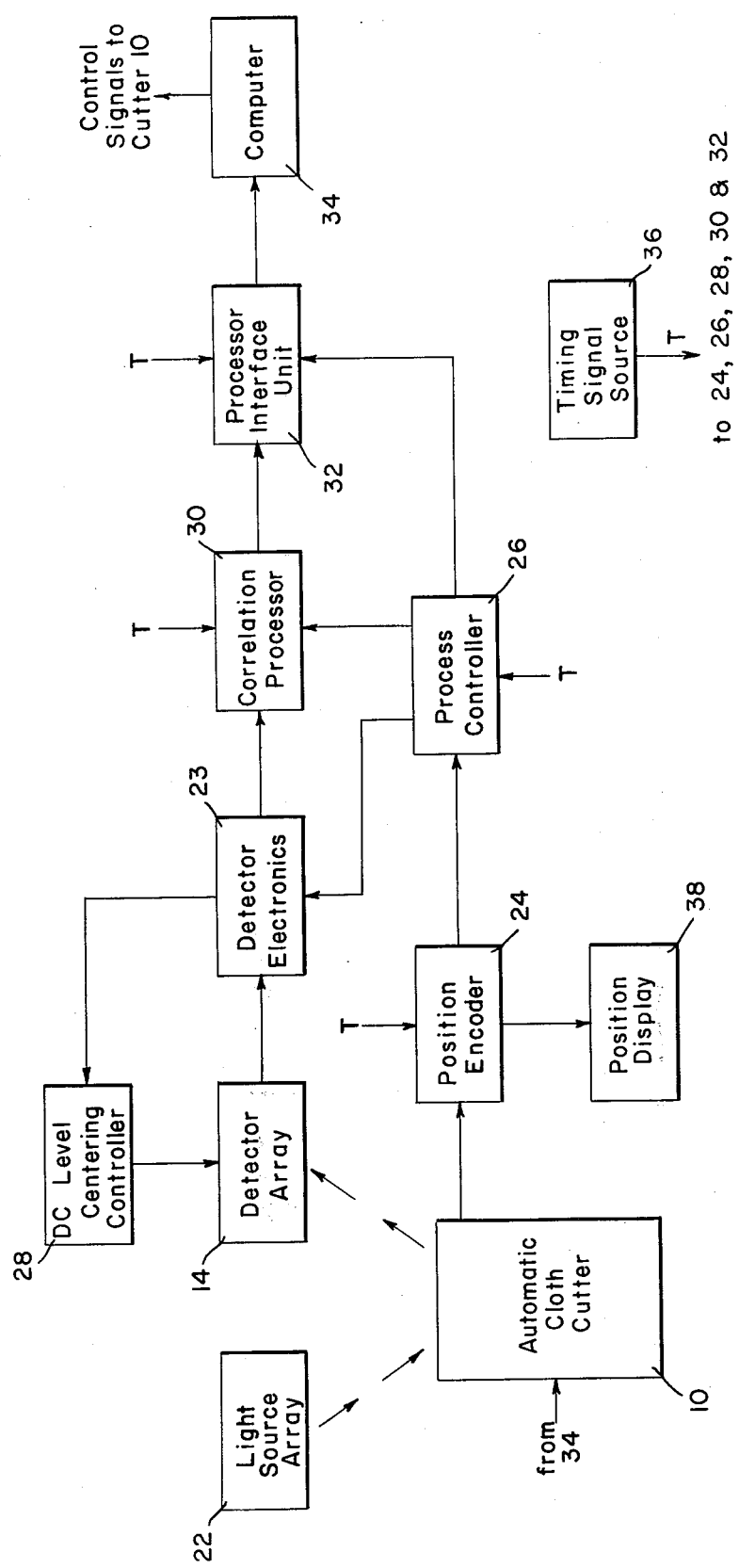
FIG. 1 is a block diagram of an automatic cloth cutter system which incorporates a plaid measurement system in accordance with the subject invention.

Reference is first primarily directed to the automated plaid cutter system of FIG. 1 which incorporated an on-line plaid measuring system in accordance with the subject invention. Automatic cloth cutter assembly 10 of FIG. 1 is shown in greater detail in FIG. 2 as comprising an automatic cloth spreader with stripe follower 12, an array 14 of five light detectors or sensors, a cutting head assembly 16 and a conveyor 18. Plaid material 20 is deposited on the moving surface of conveyor 18 by conventional spreading device 12 equipped with a standard stripe follower unit. Units 12, 18 and 16 may be those items which comprise the model LC-1 or LC-2 laser cutter marketed by Hughes Aircraft Company, Industrial Products Division, of Carlsbad, California.

Figure 2:
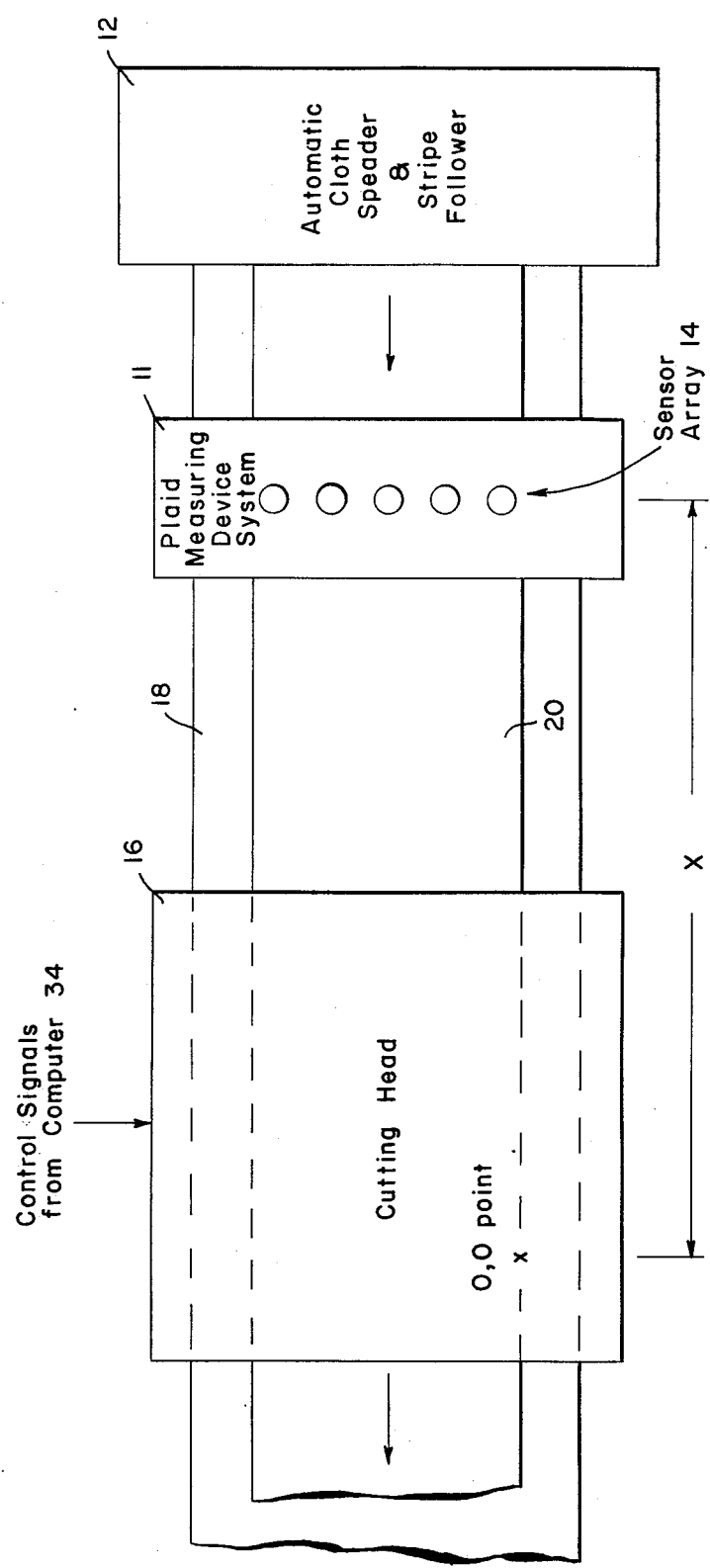
FIG. 2 is a block diagram of units comprising assembly 10 of FIG. 1.

The plaid pattern is not shown in the material 20 of FIG. 2; however, it will be understood that material 20 comprises longitudinal stripes and transverse bars, and that one of the stripes is used by stripe follower 12 so that the material has a relatively constant transverse position on the conveyor. Further, it is assumed that the stripe geometry is predictable and does not require on-line corrections; hence the plaid measuring system is required only to deal with distortions in the transverse bar pattern. The just stated assumptions conform with the characteristics of the plaid material utilized within the garment industry.

Figure 3:
FIG. 3 is a perspective view of conveyor 18, cutting head 16, and plaid measuring device 11 shown in FIG. 2.

As shown in FIG. 2, the sensors of array 14 are located a specific distance "X" from an initial point (0,0,) on cutting station 16. Each photosensor of array 14 has a light source 22 associated therewith (see FIG. 11). The sensors and light sources are mounted on a support structure 21 spanning across and above the conveyor (see FIG. 3) and the focused sensors are positioned to receive light reflected from the plaid material as it is moved under the sensors. The number of sensors required is dependent upon the width of the material as well as the particular application. Typically, for garment industry applications five to seven sensors are satisfactory.

Still referring primarily to FIG. 1, the output analog signals from sensor array 14 are at every 0.050 inch increment of the conveyor travel, converted to digital data within detector electronics unit 23 and are then processed by correlation processor 30. The purpose of processor 30 is to generate auto- and cross-correlation functions of the sampled signals so as to derive data indicative of grid pattern of the transverse bars of the plaid material.

Except for differences in the data routing the circuits for the auto-correlation channel and the cross-correlation channels are identical. Hence, in the following description the structure and function of processing channel 1 (see FIG. 6) will be described in detail and it will be understood that except for the above-noted difference the remaining plurality of channels are structurally the same.

Optical position encoder 24 is mechanically coupled to conveyor 18 (FIG. 2) of cloth cutter 10 and operates to generate two trains of pulses one of which is indicative of movement of the conveyor in the positive or forward direction while the second train of pulses is representative of movement of the conveyor in the negative or backwards direction. In response to said position pulse trains process controller 26 controls detector electronics unit 23 such that a sample of the light reflected from the plaid material is made every 0.050 of an inch of conveyor forward advance, for example. Control circuitry within position encoder 24, and which will be described in detail hereinafter, prevents repetition of samples when the conveyor for any reason moves backwards; and generation of samples resumes following backward motion only when the conveyor reaches the position it had prior to the backward movement.

The output signals from the sensors of array 14 are digitized within unit 23 and the resultant six parallel bits (per sample) data words, for example, are applied to the correlation processor 30. Said data words are also used to develop the signals from which auto centering controller 28 adjusts the DC bias of the sensors' output signals so that they are centered within the optimum acquisition region of the A/D converter.

Figure 6:
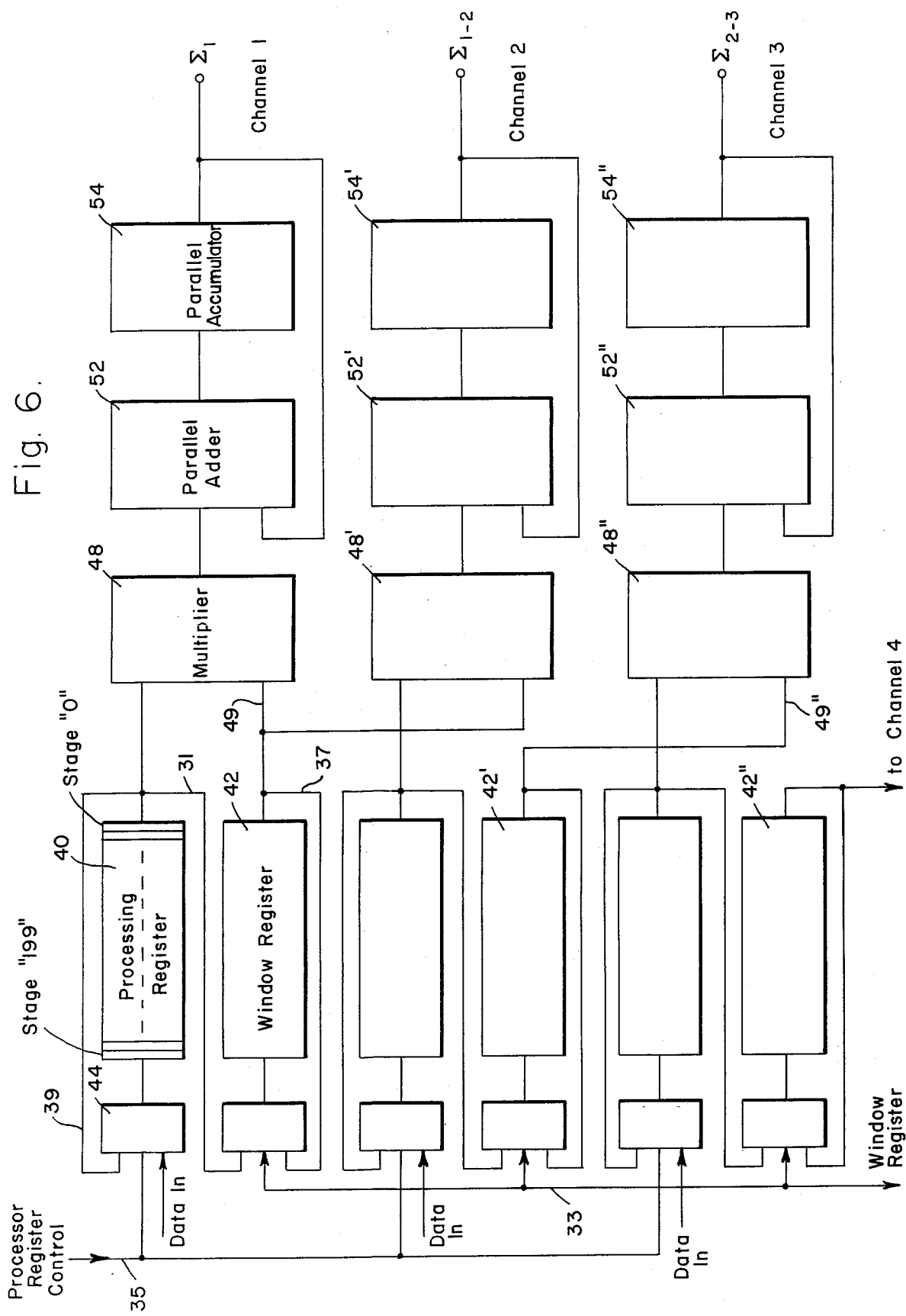
FIG. 6 is a block diagram of three channels of correlation processor 30 of FIG. 1.

Three of the five channels of processor 30 are shown in block diagram form in FIG. 6. Referring first to channel 1, it comprises two shift registers 40 and 42 each of which are 200 bits "long" and six bits "wide", i.e. the registers are adapted to store 200 data words each comprised of six parallel bits. The digitized data samples from detector electronics unit 23 (FIG. 1) are loaded into register 40 at stage 199 thereof through control switch 44 in response to a control signal on bus 35. Upon entry of each new sample the original data in the register is shifted right by one position and the data word in the stage furthest to the right (stage zero) is discarded.

For the example of one data sample per channel being taken every 0.050 of an inch, after 10 inches of conveyor advance 200 samples i.e. 200 data words of six parallel bits each, are contained in shift register 40 (FIG. 6). At this time, in response to a control signal applied to bus 33, the data from register 40, sometimes hereinafter referred to as the processing register, is duplicated in register 42, sometimes hereinafter referred to as the window register. This duplication of the contents of the two registers is accomplished by circulating the data in processing register 40 through cable 39 for one complete circulation cycle of the data, i.e. 200 shifts. During this recycling of the data output signals from stage 199 of the register 40 are not only recirculated through switch 44, but are also applied through cable 31 and switch 46 to window register 42.

Following the just described initializing of the two registers, the data in registers 40 and 42 is circulated through one complete cycle through cables 39 and 37, respectively. During this recycling, the product between the values of corresponding stages is formed in multiplier 48 as the data appears at the output of stage zero of each register, and at the same time the cumulative sum of these 200 products is formed by parallel adder 52 and parallel accumulator 54. For example, if the data in stages 0 through 199 of processing register 40 prior to a circulation cycle is designated by subscript "A", and if the data in stages 0 through 199 of window register 42, prior to a circulation cycle, is designated by subscript "B", the first term of the auto-correlation function would be formed from the sum:

$$(0_A \times 0_B) + (1_A \times 1_B) + (2_A \times 2_B) + \ldots (198_A \times 198_B) + (199_A \times 199_B).$$

After the just described operation, the resulting first term of the auto-correlation function is fed through processor interface unit 32 to computer 34 (FIG. 1). Next a control signal is applied on bus 35, the 201st data word is applied to processing register 40 from detector electronics unit 23 and stored in stage 199 of the register, the data from all of the stages is shifted one position to the right within said register, and the data previously stored in stage zero of register 40 is discarded. It should be noted that the contents of window register 42 remain unchanged. Next, the data stored in registers 40 and 42 is circulated through one cycle and during this circulation the product between the values of corresponding stages of the two registers is again formed and the sum of these products applied through processor interface 32 to computer 34.

The last described operating step is repeated for each additional sampled data word (every 0.050 of an inch) until a preselected interval of the plaid material has been sampled, for example 20 inches thereof, at which time a control signal is applied to bus 33 and the contents of window register 42 are "refreshed" by again cycling the contents of register 40 so that the data therefrom is duplicated within register 42. Following this window register update the above-described formation of auto-correlation functions is repeated for 400 samples.

Figure 7:
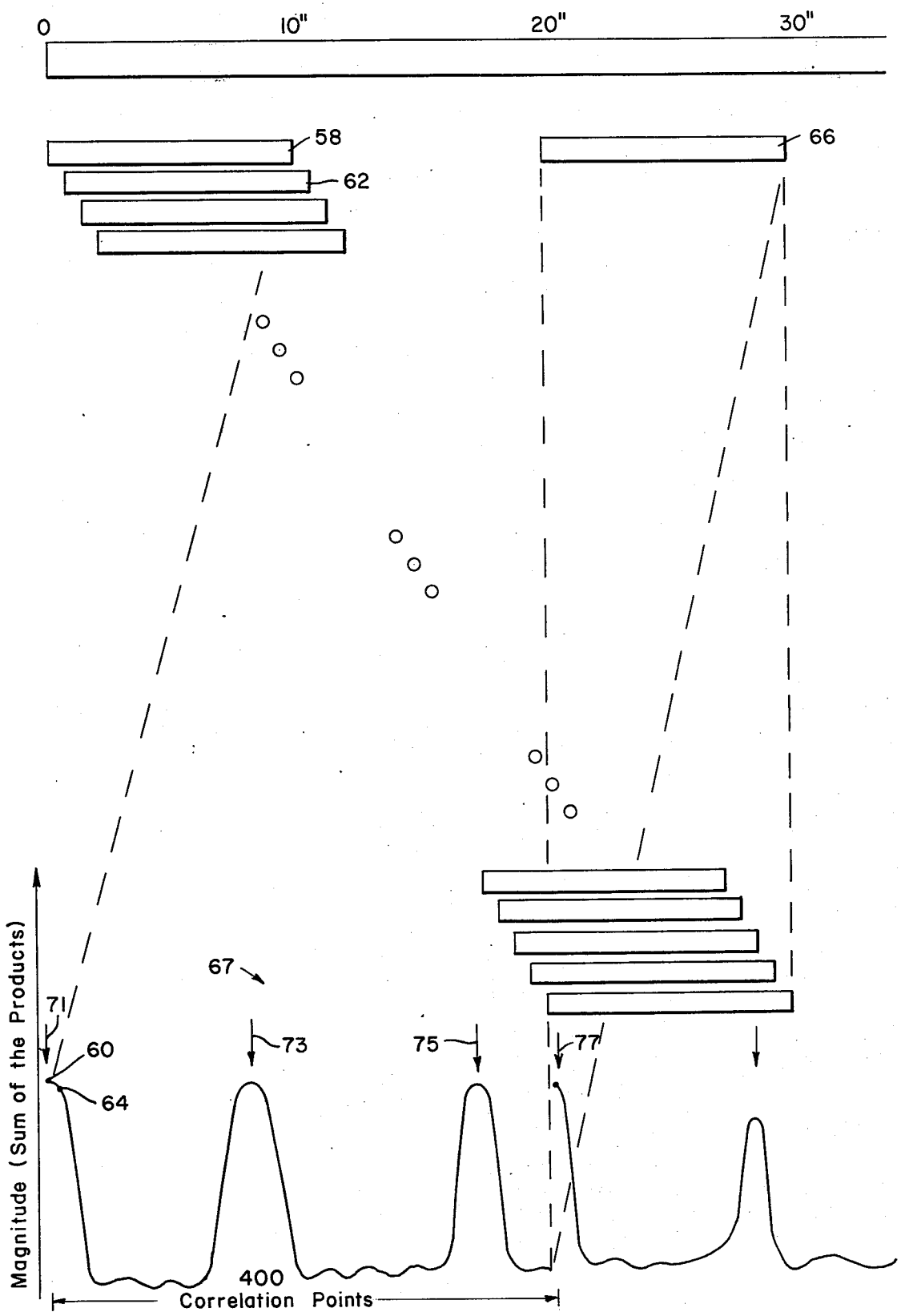
FIG. 7 is a diagram useful for explaining how groups of sampled signals are processed to provide an output signal indicative of the interval between repetitive plaid patterns.

Said correlation operation is depicted symbolically in FIG. 7 wherein the first 200 data samples stored in both processing register 40 and window register 42 are represented by block 58. The data represented by block 58 is produced from one segment of the plaid material 20 (FIG. 3) which is along a path that is approximately transversed to the bars of the plaid material. The correlation function of this data is then computed and since the contents of the two registers is derived from the same sensor channel, the resulting value, indicated by reference numeral 60 in FIG. 7, is an auto-correlation term. The processing required to produce one output point, i.e. one complete circulation of registers 40 and 42, and the concurrent 200 multiplications and 200 additions can be readily performed in approximately 200 microseconds, which leaves a substantial interval before the next sample is generated. For example, assuming a typical conveyor speed of 20 inches per second, a sample is generated only every 2.5 milliseconds.

Upon movement of material 20 an additional 0.050 of an inch, bus 35 (see FIG. 6) is enabled and a new sample is entered into stage 199 of register 40 while the information previously stored in stage zero of the register is discarded. This new block of data is depicted in FIG. 7 by numeral 62 and, as indicated, one data sample at the left of the block has been deleted and a new data sample at the right has been added. Hence, the data represented by block 62 is produced from a segment of the plaid material 20 which is along the same path as the segment which produced the data represented by block 58; and the segment from which the data of block 62 is derived overlaps the segment from which the data of block 58 is derived. Next, the auto-correlation function is produced between the information stored in processing register 40 and the original data, as represented by block 58, stored in window register 42. This correlation operation provides the data point indicated by reference numeral 64 in FIG. 7.

The just described operation is repeated every time the conveyor moves an additional 0.050 of an inch in a forward direction, i.e. a new sample is entered into register 40 and the accumulative sum of the 200 products is applied through processor interface unit 32 to computer 34.

After the conveyor has advanced the cloth 30 inches, a total of 400 points of the correlation function have been generated; see waveform 67 of FIG. 1. At this time bus 33 (see FIG. 6) is enabled, and the contents of window register 42 are replaced with the contents of processing register 40; see block 66 in FIG. 7. The above-described correlation process continues until the plaid material on conveyor 18 has traveled 50 inches from the starting point, at which time the contents of the window register are again updated.

The plaid data processing continues with "window" updates every 20 inches until the conveyor completes the programmed move, typically 5 feet. The computer evaluates the peaks of the resultant auto-correlation functions (see 67 of FIG. 7) which are indicative of the repetition interval of the bar pattern on the plaid. Still referring to FIG. 6, the structure and operation of cross-correlation processing channel number 2 is the same as that of channel number 1 except that the "window" input terms to terminal 49' of multiplier 48' are applied from the window register 42 of channel 1. Hence the output terms from signal channel 2, designated $\Sigma_{1-2}$, are cross-correlations of the data from channel 2 with respect to the "window" from channel number 1. Similarly, the window data from register 42' of channel 2 is used by processing channel number 3 and the data from window register 42' of channel 3 is applied to channel 4 (not shown).

The just described implementation of the cross-correlation channels is symbolically diagrammed in FIG. 8a. As there shown the window data from channel 1 is used in channel 1 to implement the auto-correlation function and also is applied to cross correlation channel number 2; data sampled by channel number 2 is applied as the "window" reference for multiplier of channel number 3; data sampled within channel number 3 is used for window data in channel 4; and data sampled by channel 4 is used as the window reference in channel 5.

The cross-correlation implementation shown in FIG. 8a measures accurately the amount of distortion of plaid pattern such as skew, bow, S-curve, etc., across the width of the material. However, it should be noted that the subject invention is not restricted to the implementation illustrated by FIG. 8a but is readily applicable to numerous variations thereon which may be used for measuring, alignment and other applications involving repetitive patterns, objects, etc.

Instead of having the correlation window data evolve in a step by step process from one channel to an adjacent channel as depicted in FIG. 8a, it may be preferable to use the arrangements shown in FIG. 8b. As there shown, channel 3 is selected as the auto-correlation channel and window data is used not only to provide the correlation function of channel 3 but is also applied to both adjacent channels, i.e. channel 2 and channel 4. The data sampled within channel 2 is applied as "window" data to channel 1; and similarly the data sampled within channel 4 is used as window data in channel 5. FIG. 8c depicts another correlation implementation which may be preferred for some applications. As there shown, the data collected in channel 1 which is the auto-correlation channel is applied as window data to each of the four cross-correlation channels.

Waveform 67 in FIG. 7 is a plot of the output terms ($\Sigma_1$) from channel 1. One such term per channel, for example, point 64 of waveform 67, is provided to computer 34 each 0.050 of an inch of travel of the plaid material on conveyor 18. As shown in FIG. 7 waveform 67 is made of correlation data designated by $\Sigma_1$ (FIG. 6). The peaks on this waveform designated by 71, 73 and 75 represent the rhythm "$\lambda$" of the plaid pattern.

It is noted that the first 200 output terms will not be meaningful inasmuch as 200 input samples are required to registers 40 and 42 before the first valid data point is produced, i.e. point 60 on waveform 67 of FIG. 7. However, it should be noted that the 201st point of the correlation function pertains to the beginning of the process. In other words, there is a 10 inch lag in correlation data. The first 200 output terms are utilized for transmission to the computer of dialed information such as approximate plaid rhythm "$\lambda$" which is used in softwave computation.

Computer 34 processes the output data from correlation processor 30 so as to detect the peaks thereof which are indicative of the transverse bar pattern of the plaid material. For example, the points in the top row of FIG. 9 are the peaks in the correlation data supplied from channel 1 of correlation processor 30, the points in the second row are from channel 2, etc.

Figure 4:
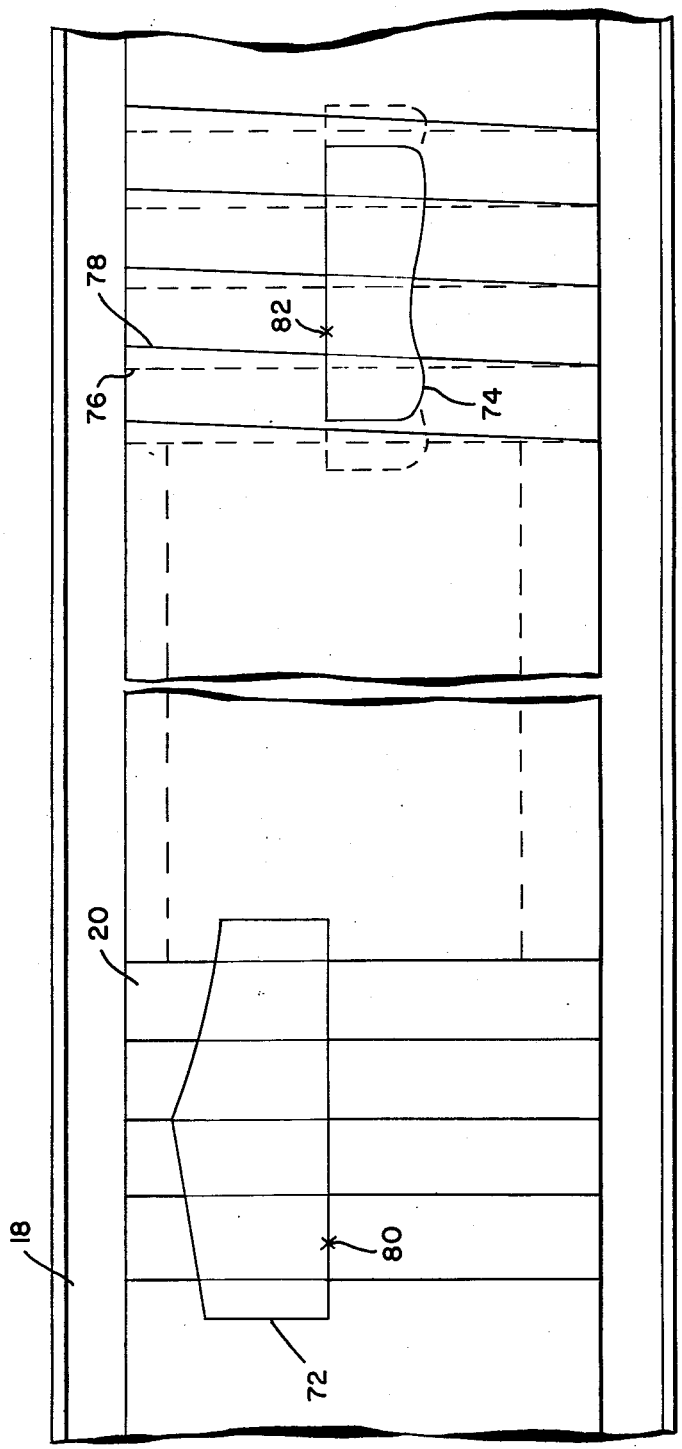
FIG. 4 is a plan view of a portion of conveyor 18 with a piece of material spread thereon and which is useful for illustrating how parts to be cut are translated in position to compensate for distortion of the bar pattern of the material.
Figure 5:
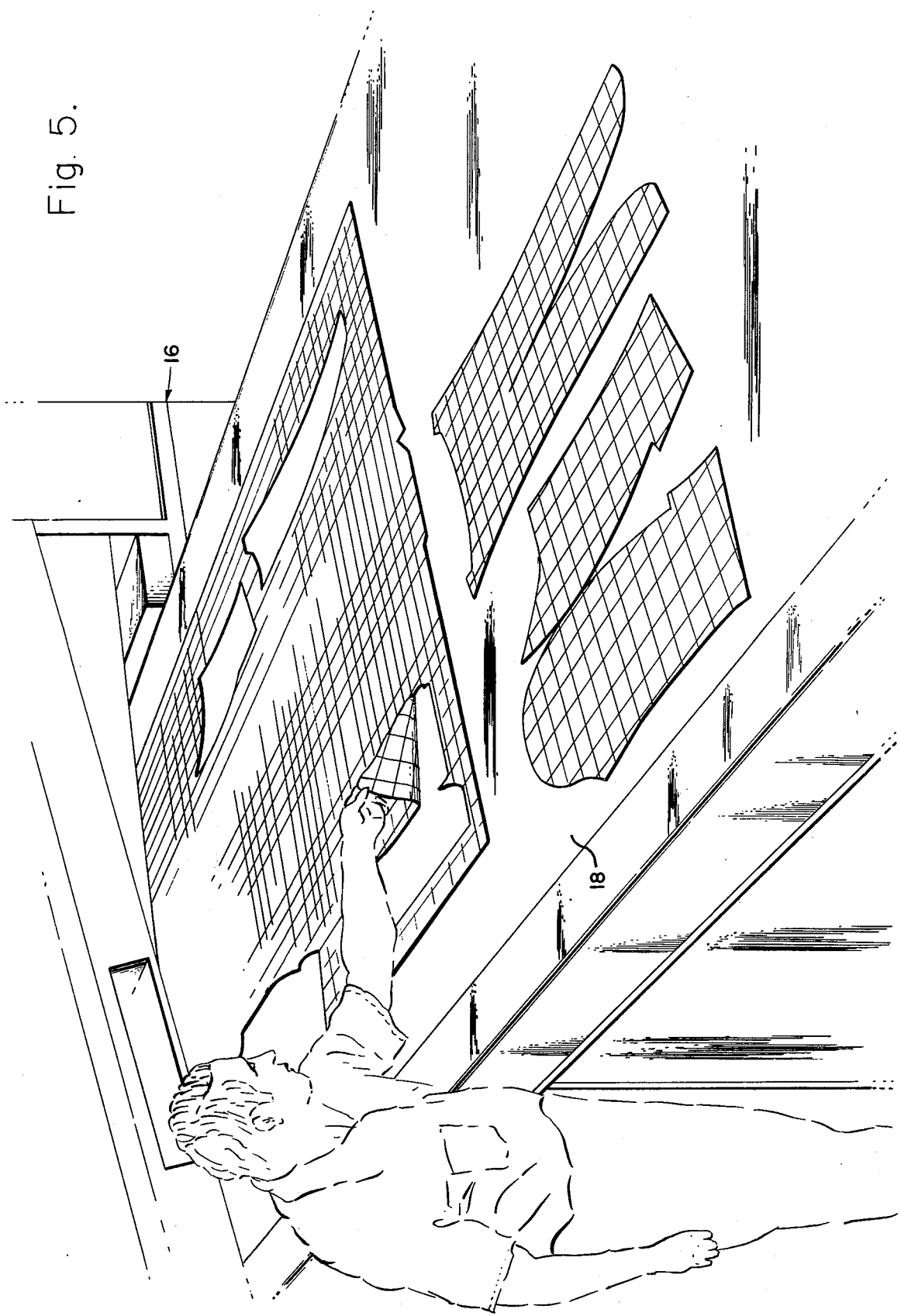
FIG. 5 is a perspective view of the output end of conveyor 18 for showing the pattern pieces cut from the plaid material.

From the information depicted in FIG. 9, the computer may be readily programmed to plaid match contiguous parts of the finished garment. This plaid matching is illustrated by FIG. 4 in which transverse bars on material 20 in the area of part 72 are shown as undistorted whereas the bars in the area of part 74 are depicted as skewed towards the right. In FIG. 4, in the area of part 74 the undistorted bar pattern is indicated by vertical dashed lines such as 76, whereas the actual pattern is illustrated by solid lines such as 78. Further, as illustrated in FIG. 4, parts 72 and 74 are assumed to be contiguous to one another in the finished garment and match point 80 of part 72 should align with match point 82 of part 74. However, for proper plaid matching the match points must have the same relative position with respect to the measured plaid bars, i.e. matching by means of the idealized undistorted plaid grid is not adequate. Computer 34 in response to the correlation data provided by correlator 30 repositions the cutting pattern relative to material 20 such that part 74 is translated in position to obtain the proper match point relationship with respect to the actual measured bar pattern with acceptable accuracy.

Details as to some of the units of FIG. 1 will not be considered. First referring primarily to FIG. 11, light from source 22 is reflected from plaid material 20 and received by photosensor 15 of sensor array 14 (see FIG. 2). The resultant sensor signal is amplified within differential amplifiers stages 72 and 74 and is then applied on output lead 86 to detector electronic unit 23 of FIG. 1. Potentiometers 76 and 78 are used to manually adjust the center value of the output signal and potentiometer 80 controls its gain. The output signal from signal autocentering controller 28 (see FIGS. 1 and 17) is applied on lead 82 and in response to this signal the sensor's output signal on lead 86 is automatically centered within the system's optimum acquisition region.

Figure 10A:
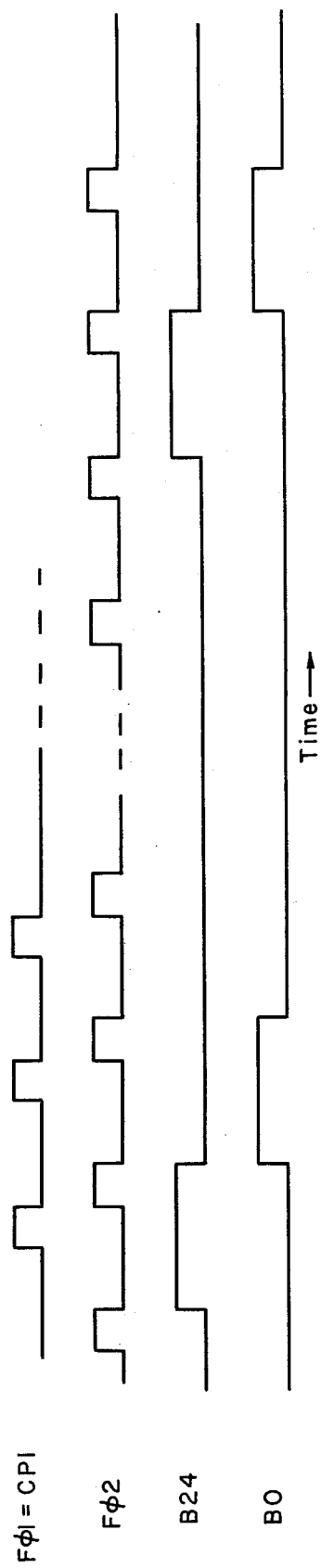
FIGS. 10a and 10b depict timing waveforms useful for explaining the operation and function of the plaid measuring system of FIG. 1.
Figure 10B:
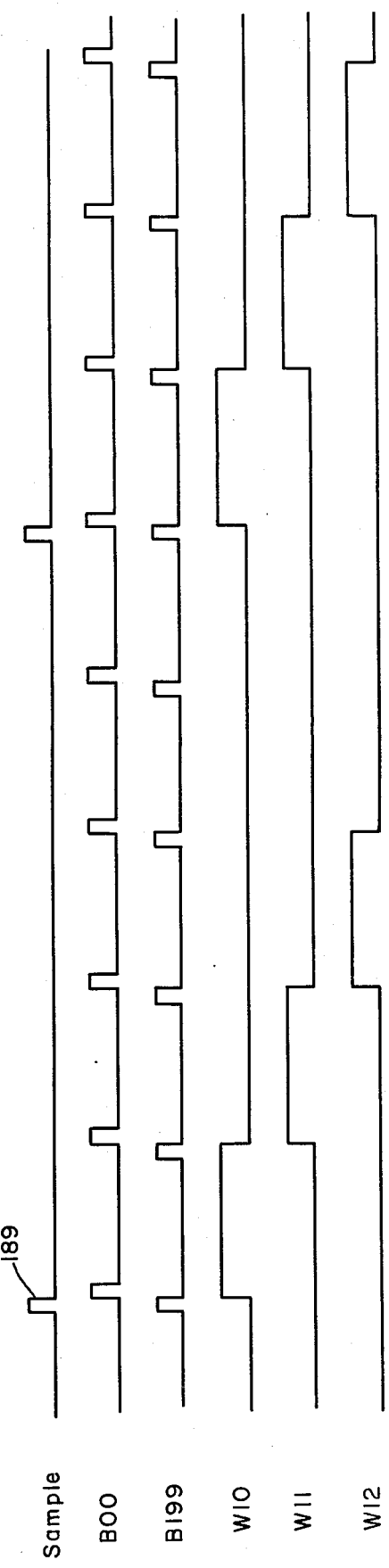
Figure 12A:
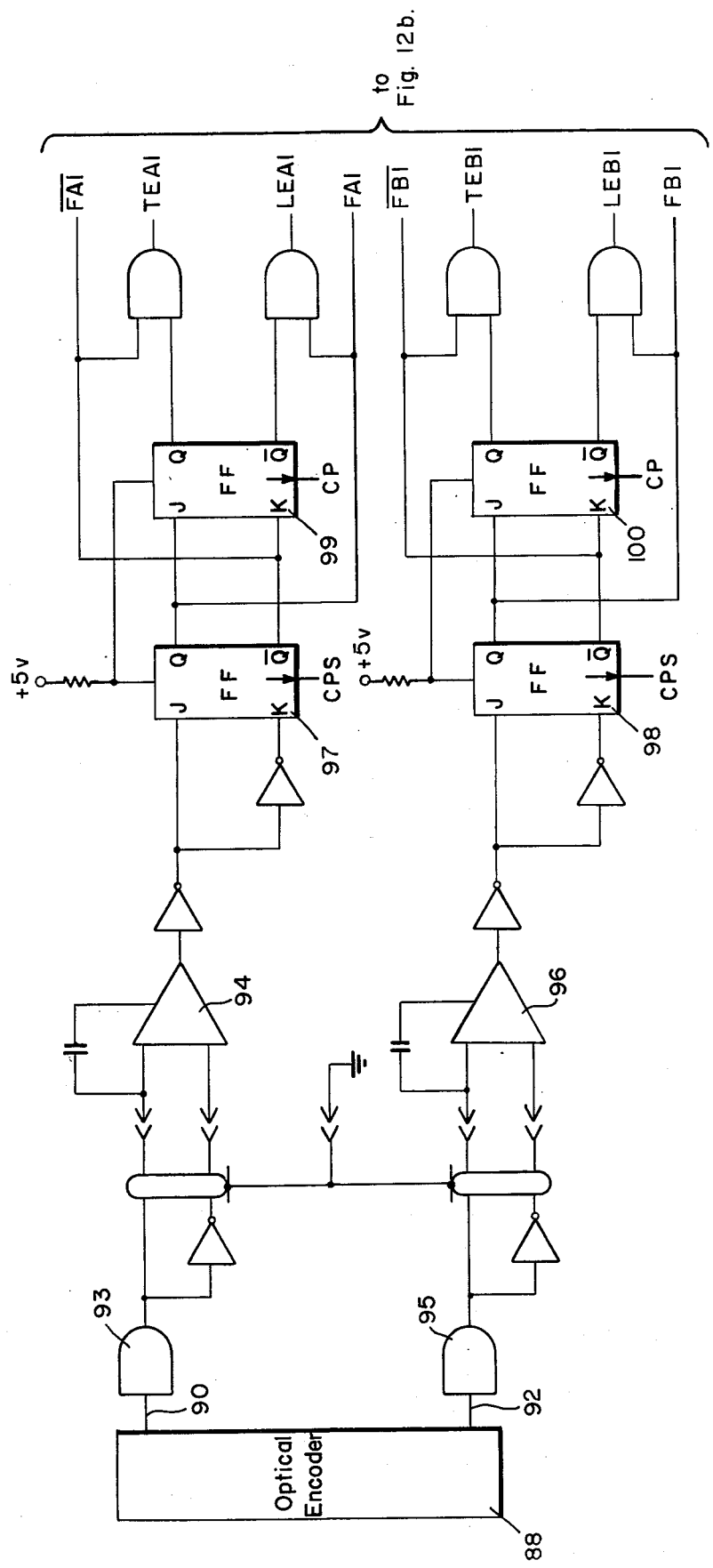
FIGS. 12a, 12b, 12c, 13a and 13b are block and schematic diagrams of position encoder unit 24 of FIG. 1.

Position encoder 24 will now be considered with reference primarily directed to FIGS. 12a, 12b, 12c, 13a and 13b as well as to the timing waveform of FIGS. 10a and 10b. The output pulses from a conventional optical encoder 88, which is shown in the left-hand corner of FIG. 12a, are applied on a lead 90 and lead 92 of the line drivers 93 and 95 respectively. Line drivers 93 and 95 may be circuit type 8830. The pulses from optical encoder 88 are processed by the circuitry of FIGS. 12 so as to be in synchronism with a system clock and, for example, one output pulse is produced on the line labeled PPCC (FIG. 12b) for every 0.001 inch of forward travel of the conveyor (positive direction); and one output pulse is produced on the lead labeled NPCC for every 0.001 of an inch of backward motion (negative direction).

Still referring primarily to FIGS. 12, line receivers 94 and 96 may be type DM 8820 circuits and flip-flops 97 through 100 may be 74107 types. Logic packages 102 and 104 may be 7454 units.

The clock pulses $\overline{CP2}$ for elements 99, 100 and 106 through 109 are provided by inverter ill from phase 2 of the system clock signals (F$\phi$2), which signals are supplied from timing source 36 shown in FIG. 1. For example, the unit 36 might contain a high frequency crystal controlled oscillator (not shown) which provides output pulses at a frequency of 24 MHZ. This pulse rate is divided by six and then by four producing 1MHZ clock rate designated by F$\phi$1 (CP1) and F$\phi$2.

The clock pulses (F$\phi$2) are processed so as to produce 25 pulse trains designated at bits, $B_0$, $B_1$, $B_2$ ... $B_{23}$, $B_{24}$; each bit is one microsecond long. For example, if the pulses F$\phi$2 were applied to a counter which counts to 25 and resets, then the pulses of the $B_0$ train (see FIG. 10a) would be synchronized by the 0 count, those of the $B_1$ train by the count of 1, etc. Trailing edge of each bit coincides with the trailing edge of F$\phi$2 pulse which is 250ns in duration. Pulse CP1 (or F$\phi$1) is also 250ns long and its trailing edge coincides with the leading edge of F$\phi$2.

Figure 12B:
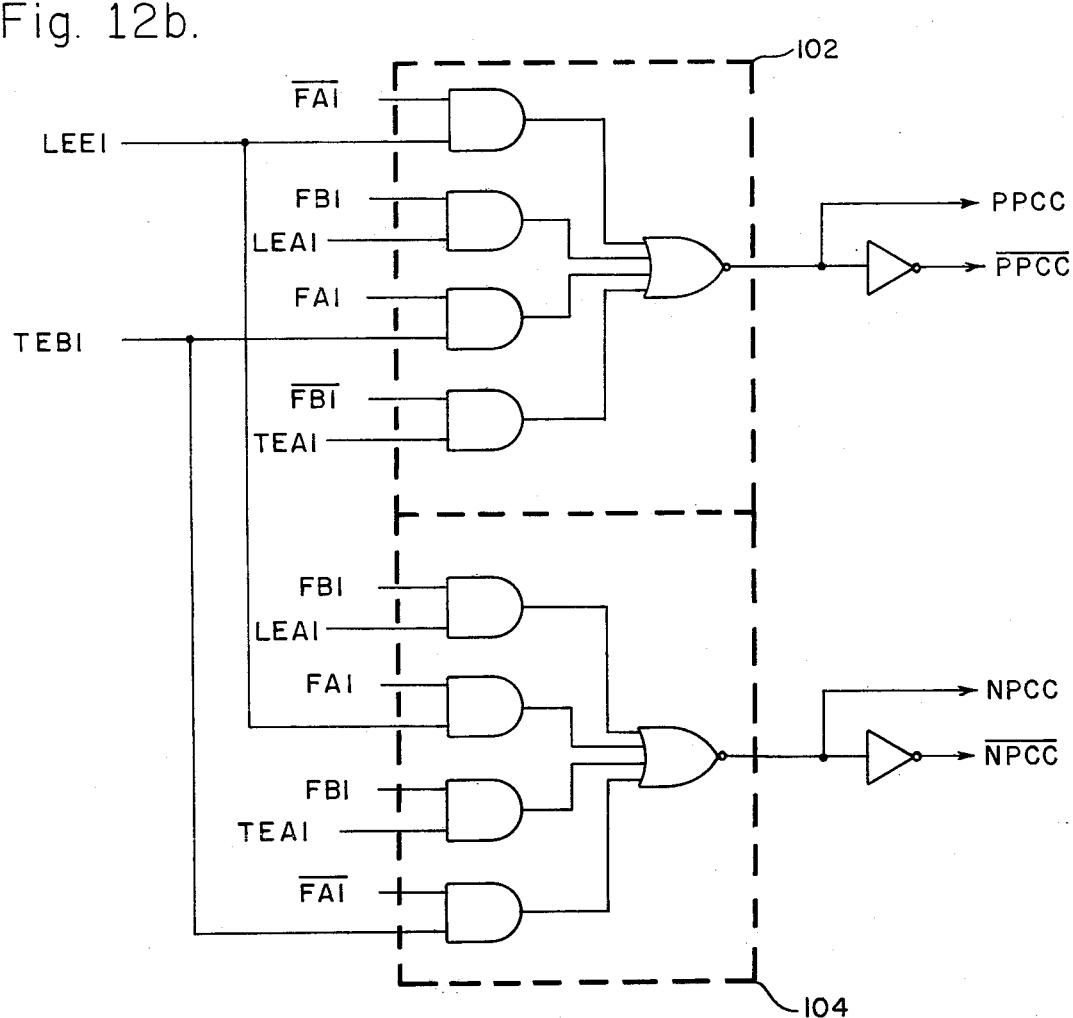
Figure 12C:
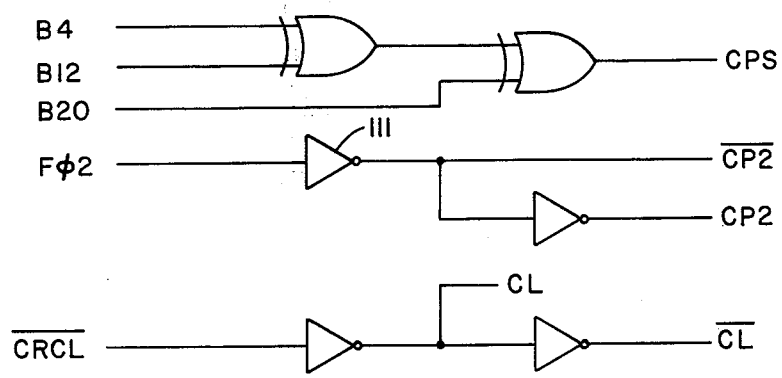

The signals CL and $\overline{CL}$ are produced by the circuitry shown in the lower portion of FIG. 12c from an input signal $\overline{CRCL}$ applied from timing signal sources 36. The signal $\overline{CRCL}$ is low whenever an operator actuated reset control (not shown) is enabled or when prime power is applied to the system. The function of the signals $\overline{CRCL}$ is to reset certain binary devices upon system startup or on direction by the operator.

Continuing the description of position counter 24, reference is primarily directed now to FIGS. 13. As there shown, the signal $\overline{PPCC}$ from FIG. 12b is applied to the "UP" input terminal of a counter 120. It will be recalled that each pulse of the train PPCC is indicative of 0.001 of an inch of forward movement of conveyor belt 18. The signal $\overline{NPCC}$ is applied to the "DOWN" input terminal of counter 120. Counter 120 may be comprised of a plurality of type units 74192; for example seven such units, intercoupled in a conventional manner so as to provide 28 parallel output bits, for example. The output signals from counter 120 are designated $\overline{FCC1}$ through $\overline{FCC28}$, and these signals are indicative of the position of conveyor 18. All stages of counter 120 are reset to zero upon the application of a clear signal "CL" which as indicated previously is applied in response to an operator command or upon application of prime power to the system.

Figure 13A:
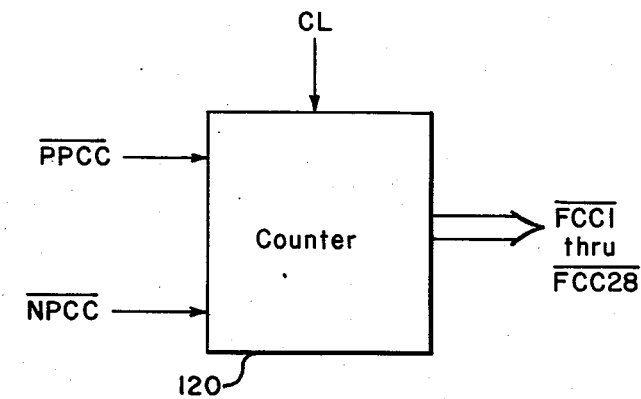
Figure 13B:
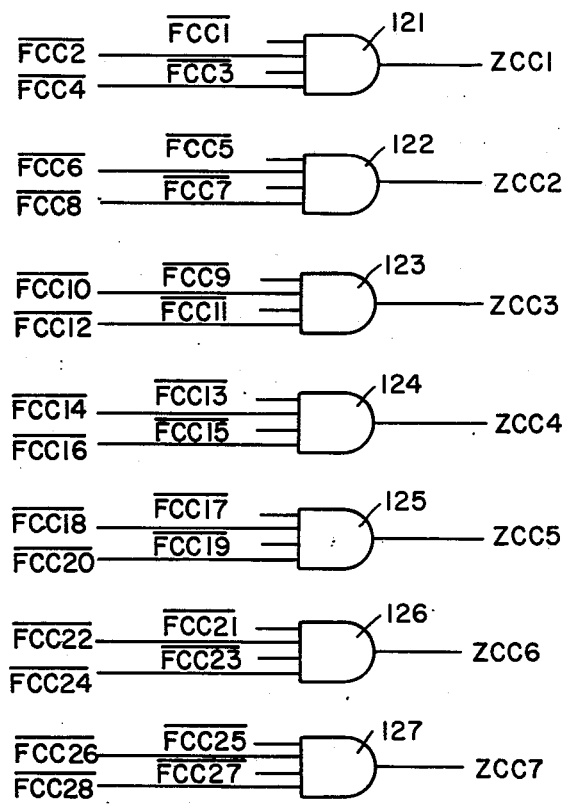

The output signals from counter 120 are applied to a plurality of AND gates 121 through 127 in accordance with the signal input groupings shown in FIG. 13b. The output signals from AND gates 121 through 127 are designated ZCC1 through ZCC7 with the numeral portion of the output signal designator corresponding to the last digit in the reference numeral of the AND gate which produces the output signal. The signals ZCC1 through ZCC7 designating "zero conveyor counter" are utilized by the circuitry of FIGS. 15 which is a portion of process controller 26.

Still referring primarily to FIGS. 13, the output signals from counter 120, i.e. $\overline{FCC1}$ through $\overline{FCC28}$, are also applied to conveyor position display unit 38 (FIG. 1) and in response thereto unit 38 displays conveyor belt position data.

Process controller 26 will now be described in greater detail with reference first directed primarily to FIGS. 14. Counter 130 may be comprised of four up-down counter stages of the 74192 type interconnected in a conventional manner so as to provide 16 parallel bits of output data which are designated $\overline{FBC1}$ through $\overline{FBC16}$. The signal NPCC from FIGS. 12 is applied through an inverting amplifier 132 to the "UP" input terminal of counter 130 so that the counter counts up one count for each 0.001 of an inch of backward movement of conveyor belt 18. Flip-flop 132 and AND gate 134 are implemented so that pulses which are indicative of forward conveyor belt movement, i.e. PPCC pulses, can count counter 130 down to zero but not below zero. As a part of said implementation, the output signals from counter 130 are processed through AND gates 135 through 139 so as to provide an output signal on lead 140 when the count held within counter 130 is zero. The purpose of the just described implementation associated with counter 130 is to provide a signal which is indicative of the fact that any backward motion of the conveyor belt has been "made up" by subsequent forward movement. For example, if the conveyor belt had for any reason stopped and moved backwards 0.010 of an inch the signal on lead 130 would not indicate the zero condition until a forward movement of 0.010 had compensated for the backward motion. It is noted that signal "zero backward count" on lead 140 will remain high for additional forward movement, i.e. said signal is high unless there has been back movement of the conveyor belt which has not been compensated for by subsequent forward movement of a corresponding amount.

Figure 14A:
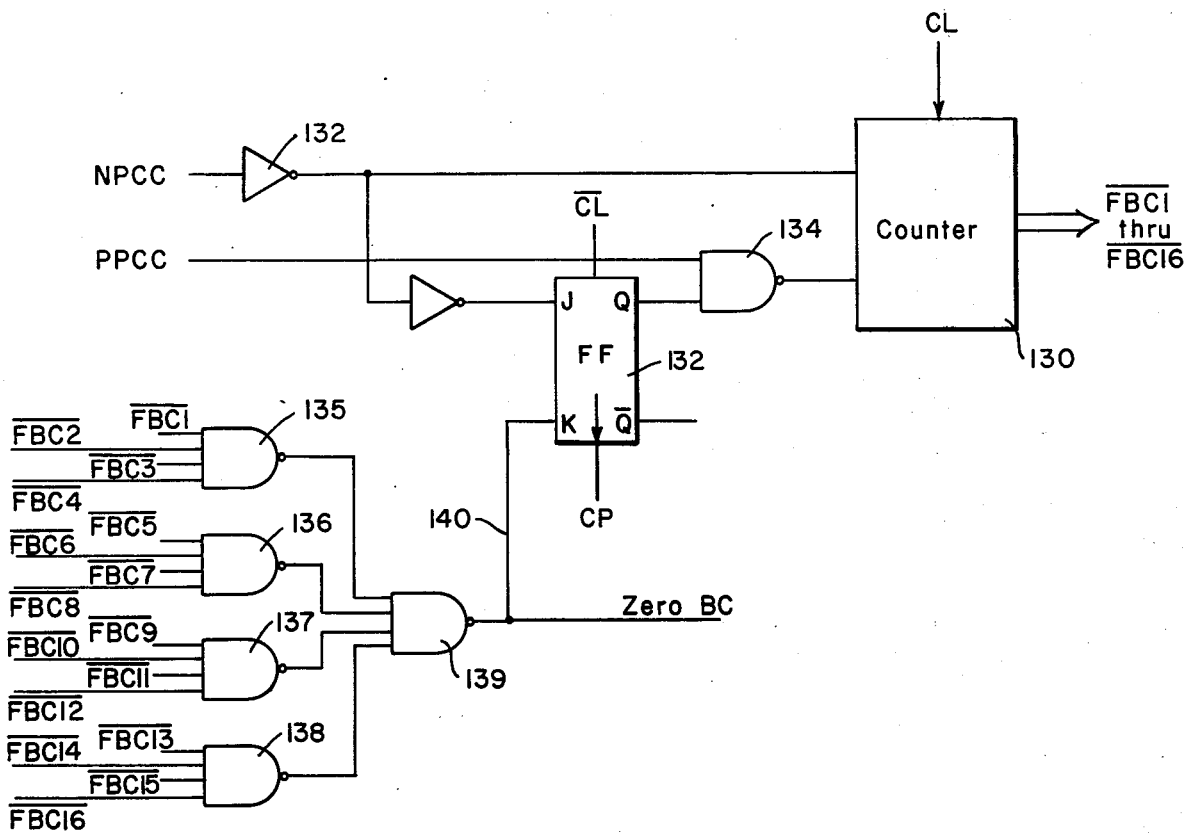
FIGS. 14a, 14b, 15a and 15b are block and schematic diagrams of process controller 26 of FIG. 1.
Figure 14B:
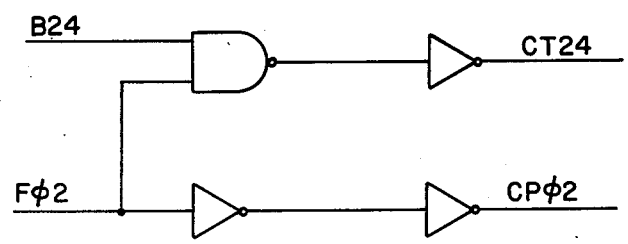
Figure 15A:
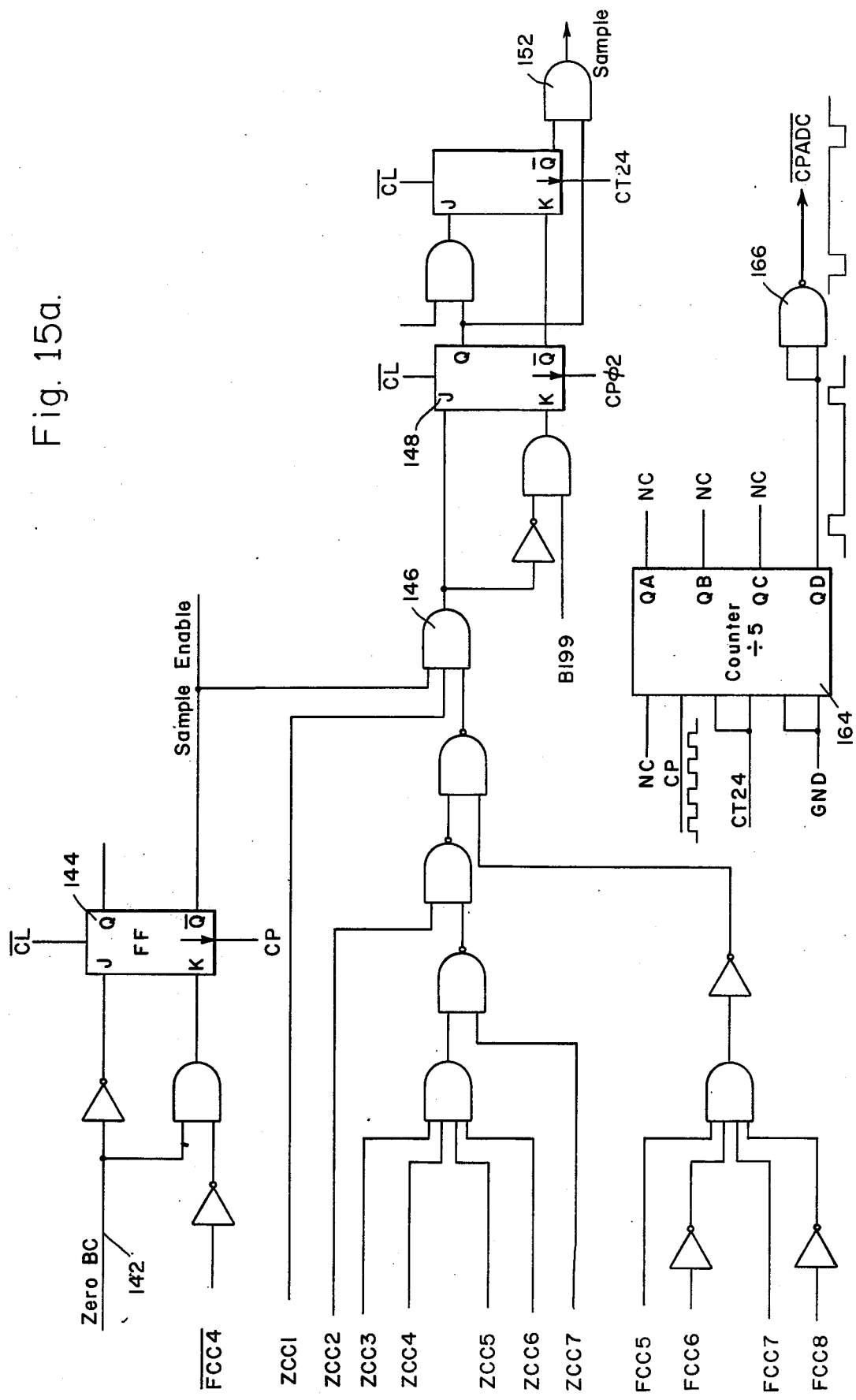

The signal "zero BC" produced by AND gate 139 of FIG. 14a is applied on lead 142, at the upper left-hand corner of FIG. 15a.

Referring now primarily to FIGS. 15, the signal zero BC and the signal $\overline{FCC4}$ are processed by circuitry which includes flip-flip 144 (FIG. 15a) so as to produce a "sample enable" signal at the Q output terminal of said flip-flop. The sample enable signal from flip-flop 144 is logically combined with the conveyor position signals ZCC1 through ZCC8 and FCC5 through FCC8 by logic elements which include AND gate 146.

AND gate 146 produces an output pulse for every 50 PPCC pulses, i.e. for every 0.050 inch of forward movement of the conveyor belt. The output pulse for AND gate 146 is logically processed with pulses designated B199 (see FIG. 10b) in logic circuits which include flip-flops 148 and 150. Signal train B199 may be produced by dividing the system clock $F\phi 1$ by 200 and is supplied by timing signals source 36 of FIG. 1.

The SAMPLE signal from AND gate 152 (FIG. 15a) is supplied to one input of a NAND gate 154 (FIG. 15b), the other input of said gate is the signal B199. The output from gate 154 along with timing signals B199 and CT24 (generated in FIGS. 14) are processed by a word generator 156, which may be circuit type 7495, to produce the timing signals W10, W11, W12 and W13 shown in FIG. 10b. These signals are used by correlation processor 30 as will be described herein later relative to said unit.

The output signal from NAND gate 154 is processed by NAND gate 158 and applied as a start signal to analog-to-digital converter (ADC) signal to detector electronics unit 23.

Circuit 164 of FIG. 15a, which is a 7490 circuit, divides the pulses CT24 by five to produce clock pulses $\overline{CPADC}$ for the analog-to-digital converter of unit 23.

Unit 23 is shown in FIG. 16 as comprising A to D converter 170 which receives the output signal from the photoelectric sensor of the associated channel, for example sensor 14 of FIG. 2. The A to D converter is enabled by the "Start ADC" signal applied from the circuitry shown in FIG. 15b and is clocked by the signal $\overline{CPADC}$. The output signal from A to D converter 170 comprises five bits, $D_0$ through $D_4$, which are indicative of the magnitude of the output signal and two bits DPS-1 and DMS-1 which are indicative of the sign of the output signal, i.e. whether the magnitude is a positive or a negative value. The magnitude bits $D_1$ through $D_4$ are processed in AND gate 172 the output signal of which is designated data limit-1 and is indicative of an above threshold level condition.

Figure 11:
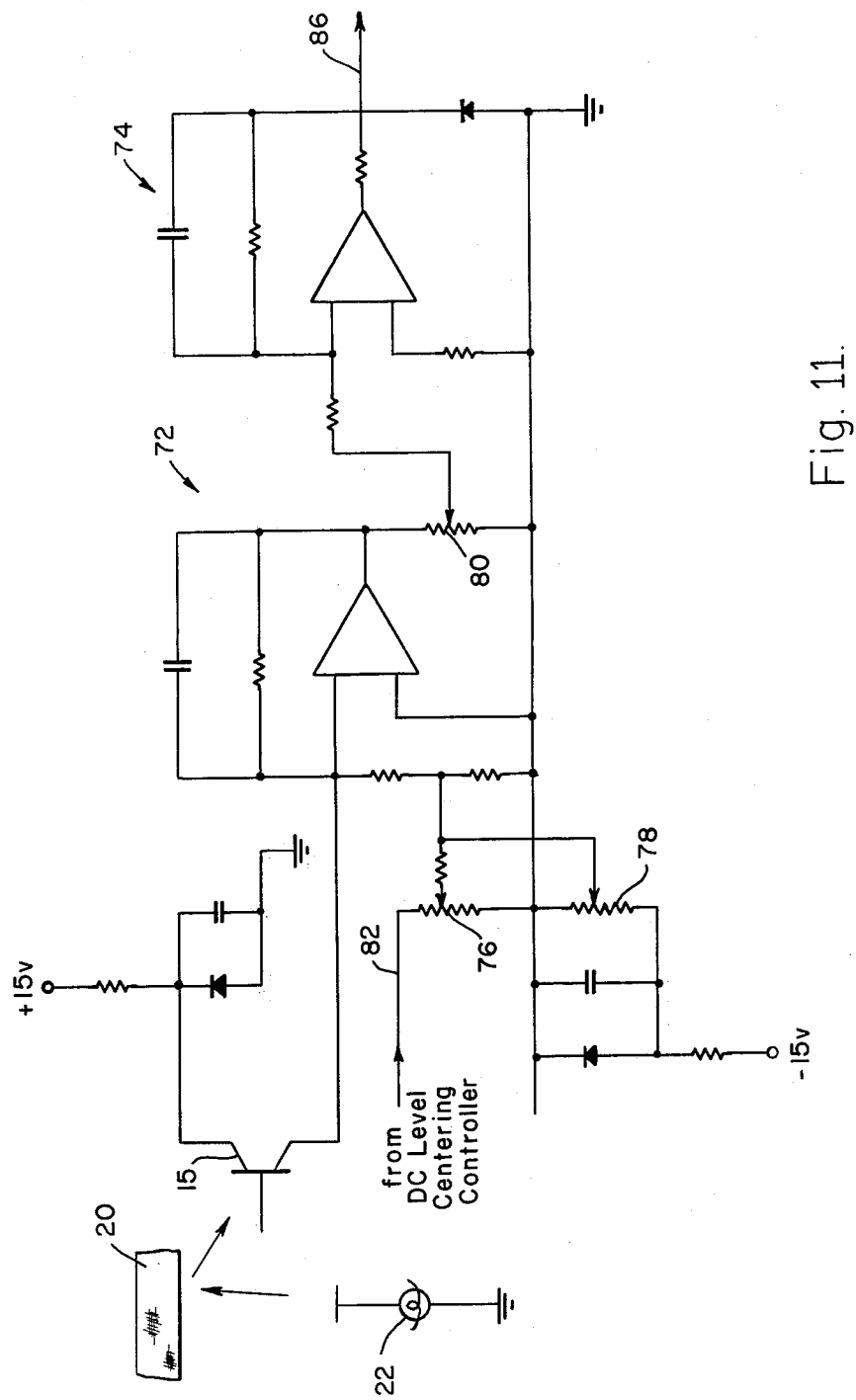
FIG. 11 is a block and schematic diagram of a one light source and sensor assembly for one processing channel.
Figure 17:
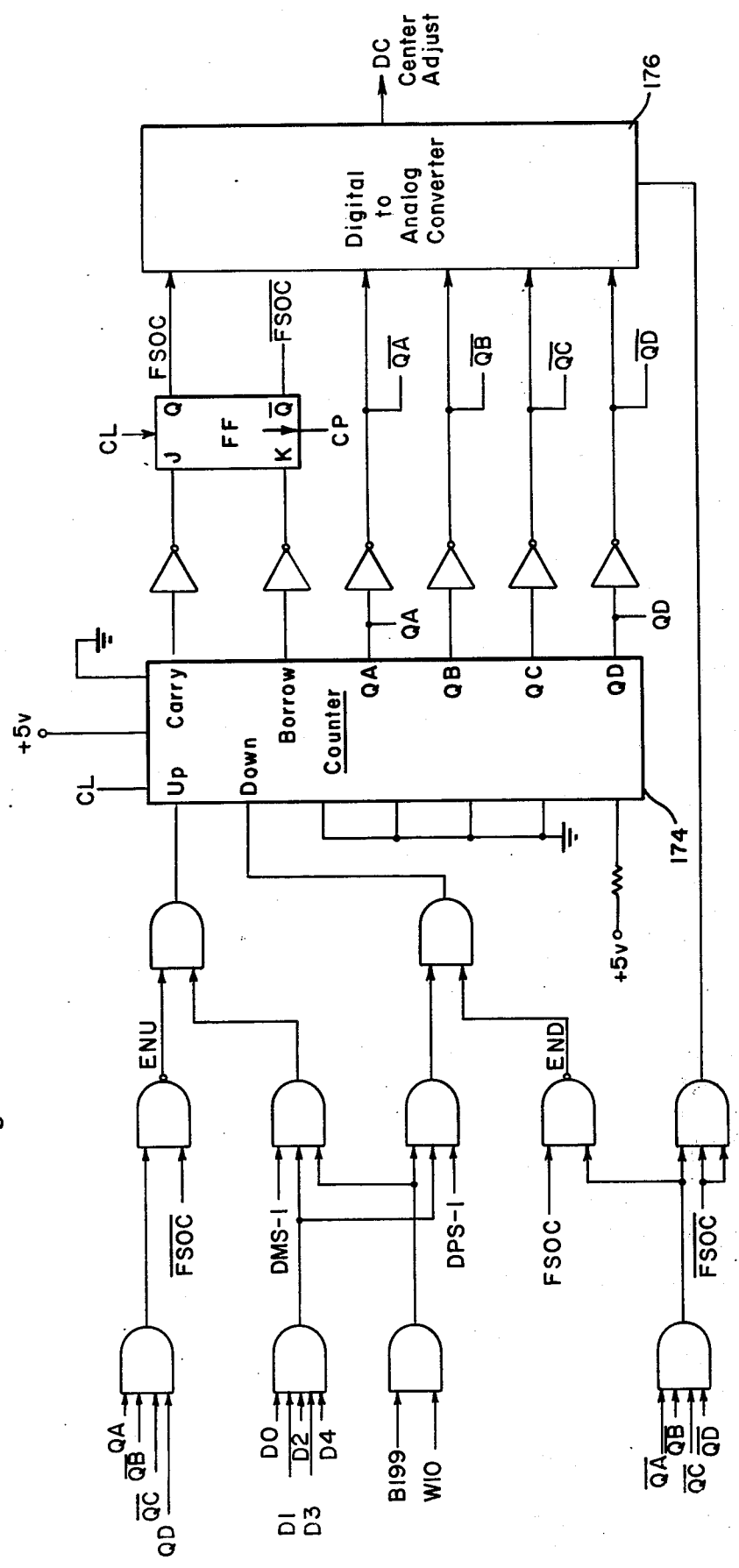
FIG. 17 is a block and schematic diagram of DC level centering controller unit 28 of FIG. 1 which provides the "offset control signal"

During initial calibration of the system its gain is set by means of potentiometer 80 of FIG. 11 such that the sensor's output signal, when properly centered, does not exceed the threshold level. However, if the DC level of the signal drifts then a data limit signal is produced by A/D converter 170 and the signals DMS-1 and DPS-1 will indicate which of the limit positive or negative has been exceeded. Referring now primarily to FIG. 17, the just mentioned signals from FIGS. 16 together with the previously described timing signals B199 are applied through logic gates to the up and down inputs of a counter 174 which counter may be a type 74193. The four most significant bits from counter 174 are processed through digital-to-analog converter 176 and the output signal therefrom is an analog voltage which is applied to terminal 82 of the sensor amplifier shown in FIG. 11. It will be recalled that in response to this signal the DC bias of amplifier stage 72 is adjusted automatically such that the output signal from terminal 86 is compensated for DC drifts.

Figure 18:
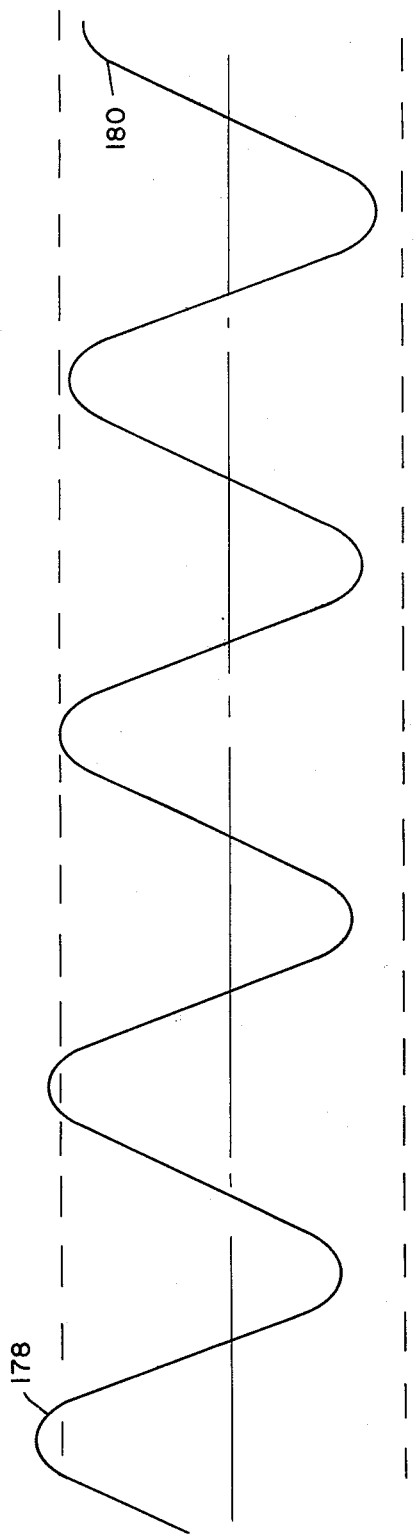
FIG. 18 is a voltage versus distance waveform useful for explaining the operation of the unit shown of FIG. 17.

The operation of the auto-centering control circuit of FIG. 13 may be better understood by referring to the waveform of FIG. 18. If, for example, for any reason the DC center value of the sensor's output signal from FIG. 11 drifts such that the sampled signals exceed the limits as indicated in area 178 of FIG. 18, counter 174 is counted down one increment for each such sample that exceeds the limit. This results in the analog output voltage from D/A converter 176 changing in the proper direction so as to bias amplifier stage 72 of FIG. 11 to cause the center value of the sensor's output signal to shift towards the correct level. This correction process is continuous, i.e. counter 176 is counted down one increment for each sample which exceeds the threshold value until the correct center value, such as shown at 180 of FIG. 18, is achieved. In other words, this correction process translates the center value of the sensor's output signals so that they are approximately centered within a preselected range of values.

Correlation processor 30 (see FIGS. 1 and 4) will now be described in greater detail starting with register 40 shown in FIG. 19. As there shown, register 40 comprises six identical parallel units 182 through 187 with units 182 through 186 processing respective magnitude bits $D_0$ through $D_4$ applied from the detector electronic unit 23 (see FIGS. 1 and 16); and unit 187 processes the sign bit. Since units 182 through 187 are identical in structure and function only unit 182 is shown in detail.

Referring momentarily to FIG.10b, the signal W10 which is produced by the circuitry of FIG. 15a commences with the first B00 pulse occurring after the sample pulse of waveform 189. The signal W10 terminates following the B199 pulse and hence is 200 clock pulse intervals in duration. During intervals other than the W10 period, clock pulses CP are continuously applied through gate 190 (FIG. 19) to bus 191 and data is circulated from the right-hand stage, designated herein as the zero data stage, of shift register 182 through lead 194 and gating circuits 196 to the left-hand stage, designated 199, of register 182. The occurrence of the signal W10 on lead 198 inhibits the transfer of CP clock pulses to bus 191 except during the clock bit of signal B199. During said inhibit interval the register is dormant, i.e. no shifting operation takes place. The signal W10 is also applied to gating circuit 196 and biases said circuit so that the data $D_0$ is applied to the input of stage 199 of shift register 192.

As shown in FIG. 10b, interval B199 is the last clock interval of the signal W10, and referring to the gating circuits associated with gate 190 respond to the signal B199 so as to pass one CP clock pulse during the B199 interval of the signal W10. In response to said clock signal all data is shifted to the right by one bit, the data $D_0$ is loaded into the "empty" stage 199 of register 182 (FIG. 19), and the data previously stored in stage zero of such register is discarded, instead of being shifted in stage 199 which is done in normal operation.

Following the described operation the signal W10 terminates and continuous clocking and recirculation of data from stage zero to stage 199 is resumed.

The signal from stage zero of shift register 182 is applied through a gate 200 to one input terminal of multiplier 48 (see FIGS. 6 and 21a). In FIG. 19, the output signal designation PRO-1 stands for the zero data bit of the processing register for channel 1 and the output signals from the other units of register 40 are correspondingly labeled. The bit designated PRS-1 is indicative of the sine bit of the processing register of channel 1.

Figure 19:
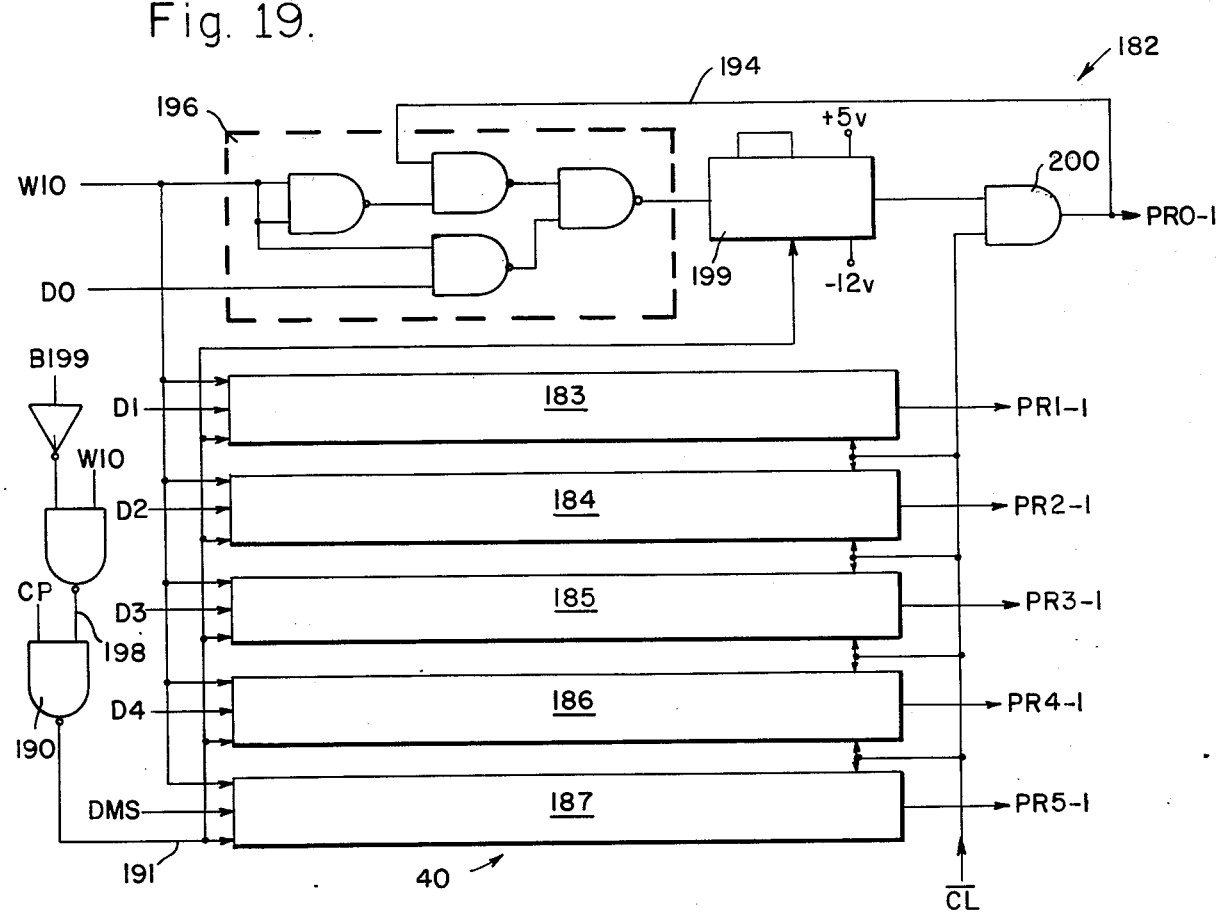

The output bits from processor 40 of FIG. 19 are also applied to window register 42 and 42' discussed hereinabove relative to FIG. 6. Register 42 is shown in greater detail in FIG. 20 to which reference is now primarily directed. As there shown, register 42 comprises six units designated 210 through 215 and each of said units is adapted to process a respective one of the applied input signals PR0 through PR4 and PR5. Since the units are all structurally and functionally identical only one such unit, i.e. 210, is shown in detail.

Figure 20:
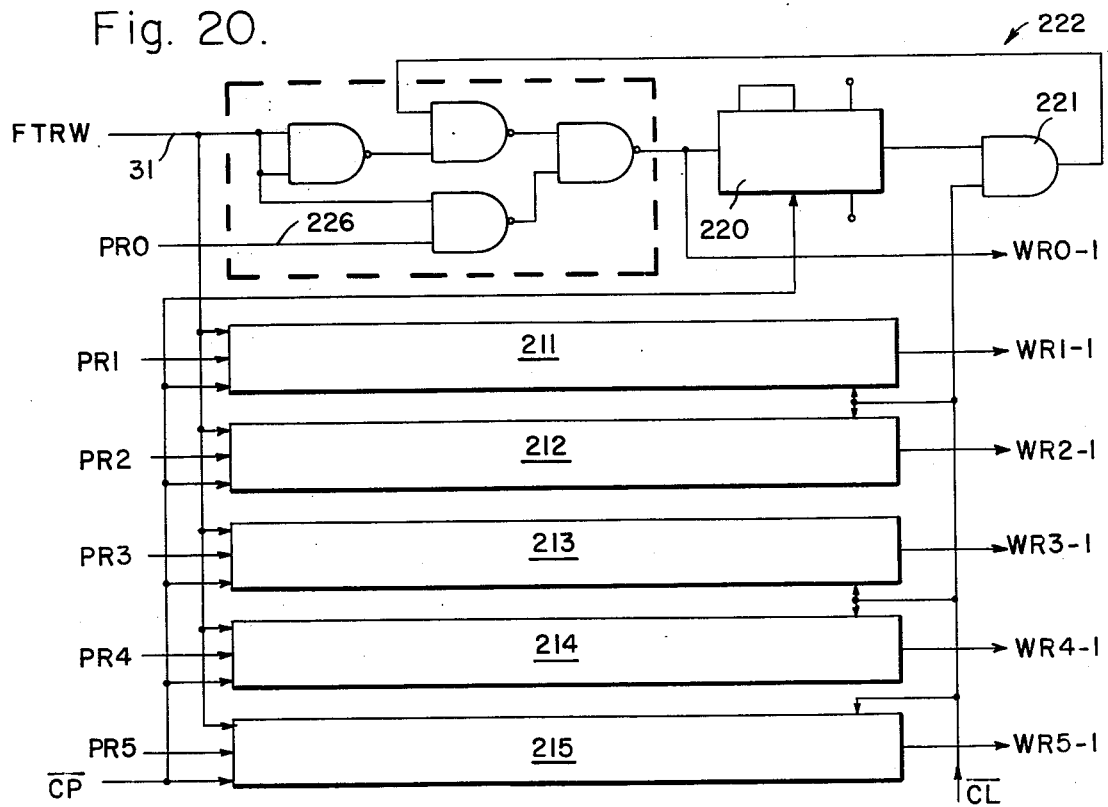

As shown in FIG. 20, unit 210 comprises a shift register 220 operatively connected such that during the absence of the window transfer signal designated FTRW applied on bus 31, the data from the register is continuously circulated such that the data from stage zero thereof is applied by means of gate 221, lead 222 and gating circuits 224 to stage 199 of said register. Clock pulses $\overline{CP}$ are continuously applied to the shift register which may be, for example, type TMS 3127, and this type of unit shifts data upon the application of clock pulses $\overline{CP}$.

Figure 15B:
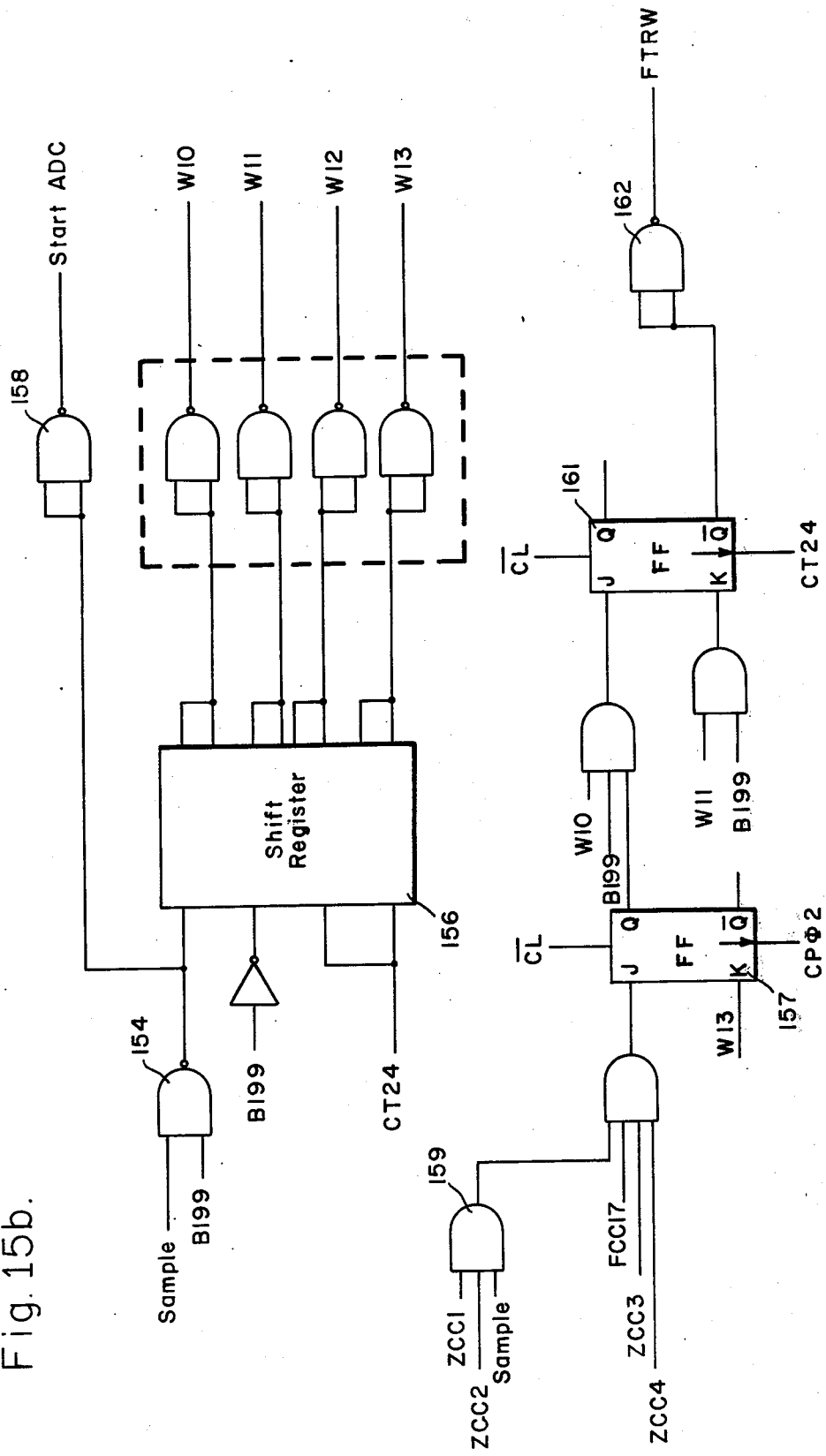

The window transfer signal FTRW is generated by the circuitry of FIG. 15b and as is evident from the gating input logic associated with flip-flop 161 the FTRW signal commences at the trailing edge of bit 199 and signal W10 and terminates at the trailing edge of bit 199 and signal W11, on selected occurrences only. It will be recalled that the window registers are updated following the first 10 inches of travel of plaid material 20 on conveyor 18 and then every 20 inches thereafter. This feature is implemented by the circuitry at the left-hand portion of FIG. 15b which is designated generally by reference numeral 159. This circuitry responds to signals from positioning encoder 24 (see FIGS. 1 and 13) and to the sample signal so as to set flip-flop 157 only during sample periods which coincides with the 200th sample (10 inches) and every 400 samples (20 inches) thereafter.

Again referring primarily to FIG. 15, during the period that the window transfer signal FTRW is applied on bus 31, FIG. 20, gating circuits 224 are biased so that the data applied on lead 226 is loaded into register 220. It is noted that the window transfer signal FTRW is 200 clock pulses in duration so during this period the entire contents from register 40 are loaded into register 42. The output signal as applied from gating circuit 224 is provided to inputs 49 and 49' of multipliers 48 and 48' respectively (see FIG. 6). As explained herein relative to FIGS. 8a-8c, the connection of the window registers to the multipliers of the various processing channels may be configured as required for the particular application. It is only by way of exaple that the window register of FIG. 15 is described as being connected to the multipliers of channel 1 and channel 2.

Multiplier 48 of FIG. 6 may be any suitable conventional unit, hence is not shown in detail herein. However, FIG. 21a shows the multiplier in block diagram form as receiving the input signal WRO-1 through WRO-4 from window register 42 and signals PRO-1 through PRO-4 from processing register 40. In response to these signals multiplier 48 produces output signals designated $\overline{PROD0}$ through $\overline{PROD11}$. Said product signals are applied to parallel adder 52 (see FIG. 6).

Figure 22:
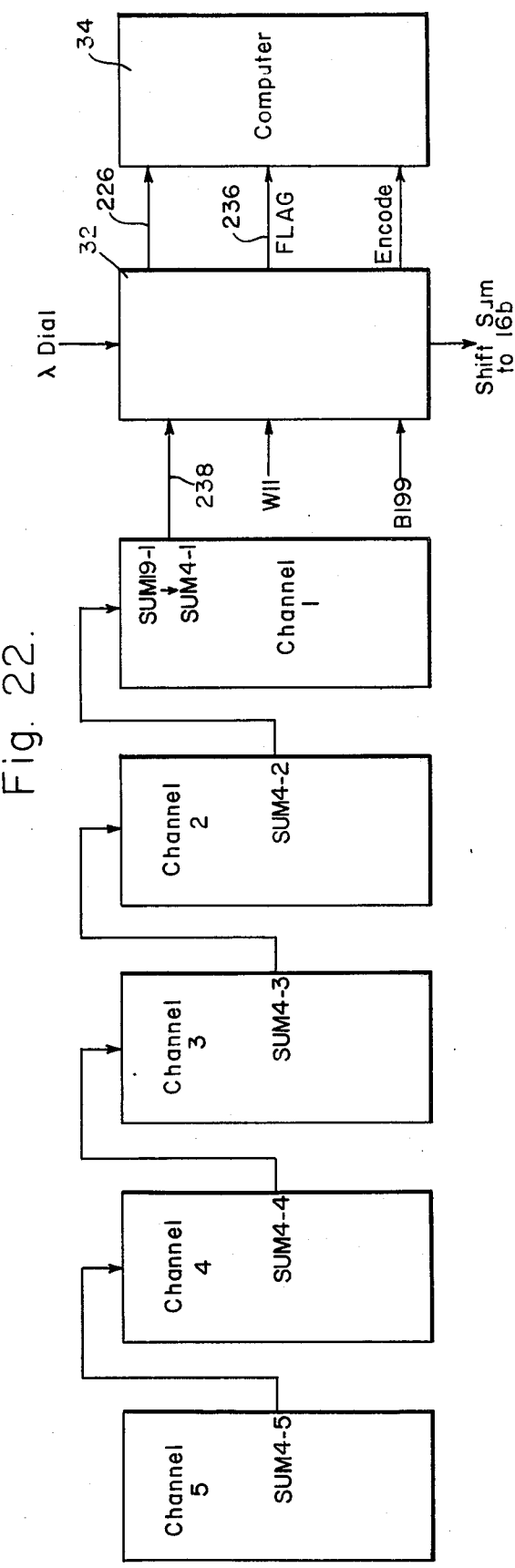
FIG. 22 is a block diagram for illustrating how the output signals from processor channels 1 through 5 are processed through interface unit 32 to computer 34.

It will be recalled that during the processing period of the signal W11 (see FIG. 10) 200 products are formed between data from corresponding stages of registers 40 and 42 and these products are sequentially accumulated by means of parallel adder 52 and parallel accumulator 54 (see FIG. 22).

Accumulator 54 may be implemented by means of five circuits of the 74194 type which are interconnected in a conventional manner so as to allow for the parallel loading of data through cable 53 or the serial loading of data through lead 55. For example, each of the 74194 units comprising accumulator 54 has control terminals, designated as $S_0$ and $S_1$, coupled in parallel, i.e. all the $S_0$ terminals are connected together as are all of the $S_1$ terminals. The logic table for unit 54 is as follows:

$S_1 S_0$ = parallel loading
$\overline{S_1} S_0$ = shift data to the right
$S_1 \overline{S_0}$ = shift data to the left
$\overline{S_1} \overline{S_0}$ = inhibit clock (do nothing)

The signals driving the $S_0$ terminals are applied from a NAND gate 230 which is shown in FIG. 21b; the terminals $S_1$ are driven by the signal W11 which is applied from FIG. 11b. The signal W11 is also inverted by unit 232 and applied to one input of gate 230 while a signal designated "shift sum" is applied through inverting amplifier 234 to the other input terminal of NAND gate 230.

The "shift sum" signal is applied from processor interface unit 32 (FIG. 1 and FIG. 22). Devices suitable for implementing the hereinafter described functions of unit 32 are well known by those skilled in the digital data processing art. In response to the signals W11 and B199 processor interface unit 32 determines that the computation period has terminated (see FIG. 10) and produces a flag signal which is applied over a lead 236 to computer 34. Computer 34, which may be for example a model 2100 made by Hewlett Packard Corporation of Cupertino, California, responds to the flag signal by receiving data signals SUM4 through SUM19 from parallel accumulator 54 of channel 1. These data signals are applied to interface unit 32 on a lead 238 and from the interface unit to computer 34 over lead 236. It is noted that the four least significant bits of the sum signal are not applied to the processor interface unit 32, in order to provide standard 16 bit number for the computer. The product summation process, however, is using all 20 bits to preserve the calculation accuracy.

Still referring primarily to FIG. 22, computer 34 receives and stores the 16 bits of the sum signal SUM4-1 through SUM19-1 and then provides an "encode" signal to processor interface unit 32 which is indicative of storage completion in the computer. In response to the encode signal, processor interface unit 32 generates the "shift sum" signal which is applied to the circuitry of FIG. 21b of channel 1 and to the identical circuitry of the four other processing channels. As a result of this "shift sum" signal, the signals $S_0$ and $S_1$ for each of the parallel accumulators in each processing channel are biased to allow the serial data shifting indicated in FIG. 22.

The "shift sum" signal is 16 clock pulses in duration whereby during the application, out of every four applications of the "shift sum" signal, the data previously stored in channel 2 is shifted out of the SUM4-2 terminal of channel 2 into channel 1; the data from channel 3 is advanced to channel 2; the data from channel 4 is advanced to channel 3, and that of channel 5 is applied to channel 4. Following the completion of said serial shifting, pulse processor interface 32 holds the data which was generated in channel 2 and said interface unit produces a second flag signal to computer 34. Computer 34 receives the information, properly identifies it as from channel 2, and produces an encode signal which is applied to processor 32 and causes the data transfer to be incremented by one more cycle, i.e. the data originally produced by channel 3 is applied through channel 1.

The above-described serial transfer of data between channels is continued until the data from channel 5 is received by computer 34. It is noted that this transfer of data is accomplished well before the next sample interval.

The data supplied to computer 34 is, therefore, in accordance with a predetermined sequence, i.e. the first flag signal after each sample (0.050 inches) is data from channel 1; the second flag designates data from channel 2, etc; and data points for a given channel are separated by 0.050 inches on the plaid material. Hence, computer 34 can store information which is indicative of waveform 67 of FIG. 7 for each of the processing channels. Peak detecting subroutines for processing the data of the type shown in waveform 67 are well known in the art and the peaks such as 73 and 75 of FIG. 7 may be stored in a format for duplicating the data shown in FIG. 9, i.e. the points defining the plaid structure for each channel are given and the curves through corresponding points of each of the five channels are computed.

The data of the format shown in FIG. 9 is utilized by computer 34 to modify the computer cutting path such that plaid matching is achieved. It will be recalled from the previous discussion of FIG. 4 that the match points on contiguous segments of the garments are caused to be aligned by changing the cutting path such that one garment part, for example part 74 of FIG. 4, is translated along the lengthwise dimension of the plaid goods until the match points of the two parts have the same orientation with respect to the plaid pattern.

Figure 23:
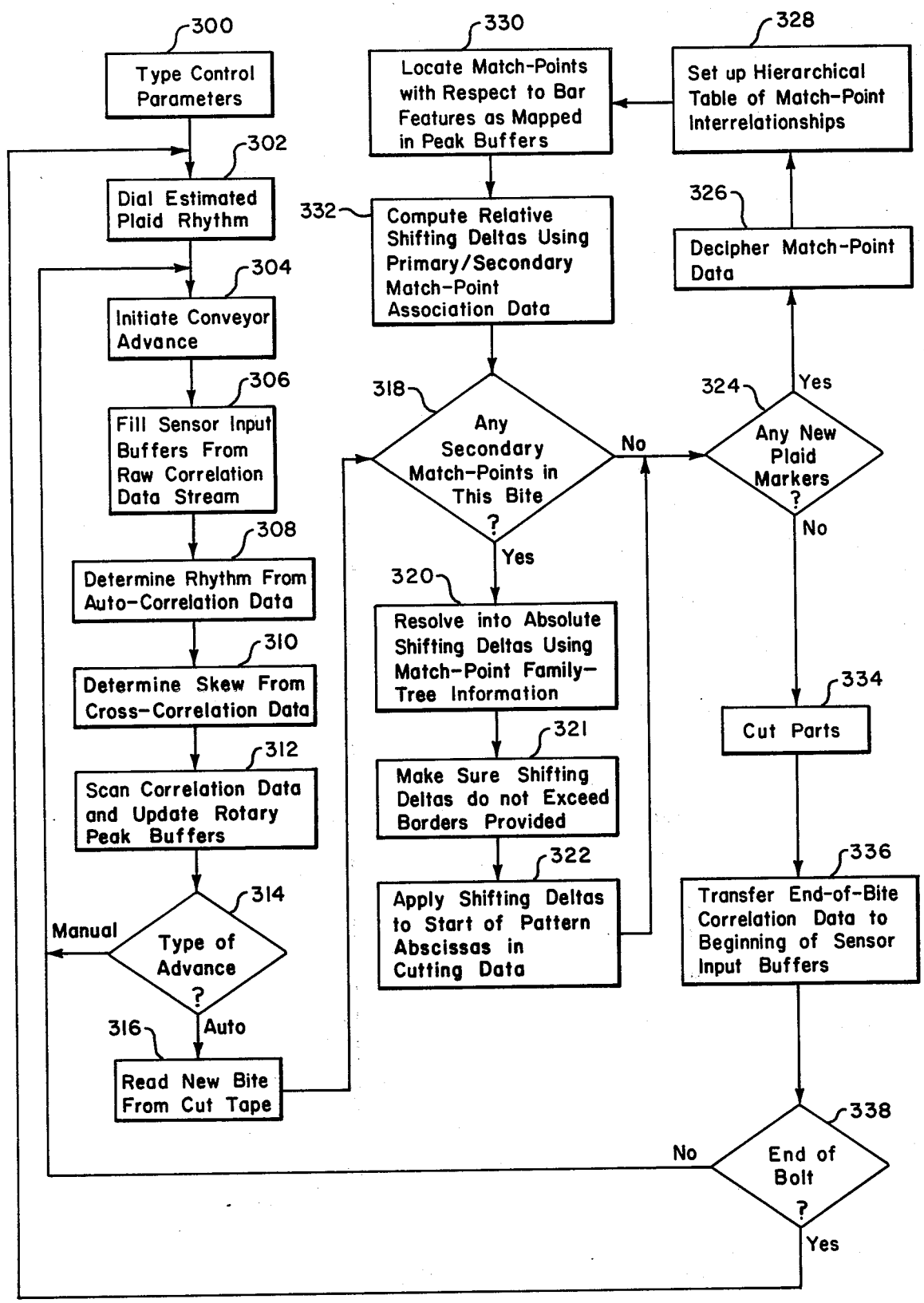
FIG. 23 is a flow chart of how the output from processor 30 is used to modify a conventional program for a cloth cutting machine.

FIG. 23 is a flow chart defining how the computer program of the Hughes Model LC-2 laser cutter may be modified as a function of the just described measured plaid data so that plaid matching between contiguous parts is provided.

Referring now primarily to FIG. 23, at 300, control parameters are provided to computer 34 (FIG. 1) by conventional data input devices, such as a teleprinter terminal (not shown). These control parameters include:

1. The number of correlation points to be used in vicinity of peaks (see FIG. 7), through which to fit estimating function,
2. number of active cutting head e.g. 1 or 2,
3. number of functional (transmitting) plaid sensor channels,
4. separation in Y between channels,
5. distance in Y of first channel from zero cutting line,
6. calibration data which indicate degree of misalignment in X of higher numbered channels with respect to channel one,
7. conveyor transducer unit, i.e. actual sample separation,
8. type of set-up, i.e. number of manual advances required to properly position goods,
9. resolution of fixed point computation,
10. processing window length.

At 302 the estimated rhythm is transmitted via correlation data lines during the ten inch initial blind spot. It consists of two binary coded decimal (BCD) digits giving inches and tenths of an inch.

Block 304 indicates that conveyor advance may be initiated manually during initial fabric positioning operations, or automatically after full control is turned over to the program.

At 306 the sensor input buffers (not shown) of computer 34 are filled from raw correlation data. For example, during the average conveyor advance (one bite) 60 inches worth of data must be accepted. This amounts to 1200 words per channel. At a conveyor speed of 25 inches per second a new set of readings is transmitted every 2 milliseconds. The average processing time necessary to input and analyze each reading is, for example, 75 micro-seconds, and so a maximum of 25 channels could be accommodated in the available processing interval. A bit may also be defined as the unit of goods associated with one cutting operation (marker), i.e., the conveyor is advanced one bite, the conveyor stops cutting is performed and then the conveyor advances to the next bite.

An additional fifty words of storage is provided at either end of said buffers; and on the trailing end, this allows for a conveyor overshoot of up to 2½ inches. The leading excess is provided so that the last normal 2½ inches (i.e. from 57½ to 60 inches) can be preserved from bite to bite in case there was a peak so close to the bite boundary that an insufficient number of points are available in any one bite to accurately estimate exact peak location.

The interrupt system is turned off during the time when these buffers are being cycled in preparation for another advance, so that data will not be accepted while pointers are being manipulated.

It is assumed that the conveyor will be at rest whenever the interrupts are disabled. Readings are transmitted under a handshaking protocol, so that even if a mechanical disturbance should trigger a sampling while interrupts are suspended, these readings will not be lost provided the disturbance is not so drastic as to produce movement sufficient to trigger multiple samples over the duration of such suspension.

At 308 an attempt is made to determine the plaid rhythm ($\lambda$) automatically, by analyzing auto-correlation data for natural frequencies. The presence of regular sub-multiples of the actual rhythm, which exist in some fabric designs due to pronounced secondary bar features, makes it impossible to rely solely on any automatic scheme. The value of this attempted determination lies in the fact that while more than one rhythm might be found, the true rhythm will always be found provided the signal is good. It is therefore a check on the quality of the correlation signal and also on the validity of the dialed input. If a rhythm is found which does not differ by more than 20% from the dialed input, that rhythm is considered the true plaid repeat, and becomes the starting value which is used to begin tracking on a particular channel.

After the rhythm has been ascertained from the auto-correlation data, the cross-correlation data is then used at 310 to determine the amount of skew. Preferably the skew of the fabric should be less than a full half rhythm, say to ⅓, in order to avoid possible confusion.

The cross-correlation data is searched beginning at a point which is a distance slightly more than one-half of the rhythm from the reference point of the auto-correlation channel. This search is carried through a distance of slightly less than a full rhythm. From the peak which should be found in this interval, a full rhythm is subtracted to give a skew that will be anywhere from $-\frac{1}{2}$ to $+\frac{1}{2}$ of the rhythm. The relative skew values thus determined are finally resolved into absolute skew information referenced back to channel one.

Steps 308 and 310 are only taken on the first manual conveyor advance following the spreading of a new bolt of fabric or following a reset condition. However, step 312 is taken on every advance. At 312 the correlation buffers are scanned to determine the exact location of all peaks corresponding to the plaid repeat. This is not necessarily an indication of where some prominent bar feature is located, but is rather an indication of where the same region is repeated as happened to fall under the sensing heads at the start of observation.

These rotary buffers are floating point arrays with a capacity of about 250 values per channel. The number of bites worth of peak data that can be retained is directly proportional to the size of the plaid repeat and since a greater number of bite's worth of such data need to be retained for processing on head #2, only larger plaids (2 or more inches) can be handled there. The smaller plaids (down to the lower limit of just under 1") have to be cut on head #1 for this reason.

At 314 it is determined if the advance were manually or automatically commanded. If the advance was manually commanded there will be no cut tape data to look at and the program simply waits for another manual advance, or for the first automatic advance. If the advance was automatic, then cutting (and matching) data will be applied.

At 316 one bite (approximately 60 inches) worth of cutting data is read from the magnetic tape which controls the cutter, e.g., the previously mentioned LC-2 laser cutter system.

Before checking to see whether any new markers are starting in the bite just read, a check is first made at 318 to determine whether there are any secondary points remaining in a marker that may have started in a previous bite. If so, then the computation must be performed at 320-322 which yield the shifting deltas for the parts on which these points lie, before beginning to process matchpoint data associated with a new marker.

After the computations of steps 320-322 have been performed (or if the absence of any secondary points makes such computations unnecessary), at 324 the program looks to see whether any new markers are starting in this bite, which have plaid data associated with them. If there are, then this data is analyzed and such of it as pertains to the current bite is applied to the cutting data. Once all such new markers (and usually there will be at most one) have been taken care of (or if there were no such new markers) the control proceeds to the actual cutting of parts.

At 326, if a plaid marker is starting in the bite just read, then all of the plaid matching information associated with the whole marker will be found appended to the end of the bite following the normal cutting data.

A portion of the second word in the bite contains a pointer to the word immediately following the end-of-bite word for normal cutting data. This is where the match point data begins. It is laid out as follows:

| | |
|---|---|
| $\lambda$ | (1) |
| l | (2) |
| w | (3) |
| # of pieces (=n) | (4) |
| bite # | (5) |

-continued

| | |
|---|---|
| address of S.OP.X - coordinate | (6) |
| left boundary | (7) |
| right boundary | (8) |
| (n such groups of 4 words) | |
| # of match points (=m) | (9) |
| P/S Part # Pair # | (10) |
| X - coordinate | (11) |
| Y - coordinate | (12) |
| (m such groups of 3 words) | |

(1) $\lambda$ = nominal plaid rhythm (.01" units)
(2) l = marker length (.01" units)
(3) w = marker width (.01" units)
(4) n = number of pieces within marker on which match points of any kind occur
(5) bite sequence number of the bite in which a piece falls
(6) address relative to start of bite of the start-of-pattern X-coordinate (which is the quantity that has to be altered to effect a shifting of the part)
(7) amount of room provided for leftward shifting (.01" units)
(8) amount of room provided for leftward shifting (.01" units)
(9) m = number of match points within marker
(10) match point control word containing the following three items of information: (a) bit 15: primary secondary status bit (primary = 0, secondary = 1) (b) bit 14-8: part number of part on which match point falls - this is an index into the 4 × n array of piece data described in (4) thru (8). (c) bits 7-0: pair number. Match points are grouped into a hierarchy starting with a root point whose fixed location governs the positioning of all other subordinated points. This is the first primary point and together with the secondary point on another piece, forms pair #0.
Up to 256 pairs can be accommodated. The largest number of different parts that might be involved in a related family is 257 in the extreme case that no part has multiple primary points. A maximum of 127 parts can be accommodated. These limites are more than sufficient for the normal plaid marker which is unlikely to have more than twenty or thirdy matching parts.
(11) X - coordinate of match point (.01" units) relative to an origin located at the lower lefthand corner of the marker (not the bite).
(12) Y - coordinate of match point (.01" units)

The information just outlined is used at 328 to construct a match point interrelationship table whose Ith entry is set equal to J if part I depends on part J in the sense that the secondary point on part I has its governing primary point on part J.

At this point all areas of cloth on which match points occur for the current marker have been examined by the plaid sensors and mapped as described above at 312. This just stated condition imposes a restriction on marker length as a function of the placement of the plaid sensors with respect to the cutting zone.

At 320 match points are located within the grid of bar features as recorded in the peak buffers. Linear interpolation between channels is used where a point does not lie exactly on a sensor track, but instead lies between two sensors. Linear extrapolation is used for points below the first sensor or above the last one.

The quantity here computed is the distance in X of the match point from the nearest bar feature. A positive distance indicates the point is to the right of the feature, negative to the left.

Considering the match points as isolated pairs, a set of shifting deltas is produced at 332 giving the amount by which a part would have to be shifted in order to bring its secondary point into the same relative position with respect to the plaid bars of the governing primary point. This will be the actual amount of shifting necessary only if the portion on which the primary point lies does not itself have to be shifted.

By combining the match point dependency information from step 328 with the raw shifting deltas produced in step 332, absolute shift data is generated at 322 giving the total amounts by which all parts must be shifted in order to match up related pieces on the basis of root point location.

The absolute deltas thus obtained might be greater than $\lambda$ in magnitude. If so, at 321 multiples of $\lambda$ are subtracted off without affecting the match. Since the actual rhythm may vary from place to place on the fabric, a table of the actual $\lambda$ observed in the vicinity of secondary points is prepared in step 330, in case this step becomes necessary.

Even if the Δ is smaller than λ, it might be larger than the border provided for movement. If so, then a shift of λ−Δ in the opposite direction would be just as good. If this also exceeds the border, then the part cannot be matched and will therefore not be cut.

For those parts with secondary points on them, which occur in the current bite, the absolute shifting delta found in 321 is implied to the start of pattern absolute X-coordinate at 322. Since the laser-on movements which result in cutting the perimter of the part are all incremental, this single adjustment is all that is needed to shift the entire part, the pre-use amount necessary to achieve a match.

After all such adjustments have been made in the data, the bite is cut at 334.

After cutting is complete, but before initiating the next advance, at 336 the last 2½ inches of correlation data is cycled around to the beginning of the sensor input buffers as described relative to step 306.

Processing continues with the next automatically initiated conveyor advance, unless step 338 indicates that the end of a bolt of fabric has been reached and it is desired to begin processing a new bolt with a different plaid pattern. In this case the correlation hardware is reset and the appropriate new plaid rhythm estimate is dialed in.

Thus, having described new and useful methods and systems for measuring the transverse grid pattern of plaid materials, what is claimed is:

1. A system for providing signals which are indicative of the spacing between repetitive transverse bar patterns of a plaid material, said system comprising:
   sampling means for providing sample signals which are indicative of the relative light reflectivity of said material at given increments along a first path which is substantially parallel to one dimension thereof, said one dimension being approximately transverse to said bars; and
   a correlation processor which includes means for selecting a group of consecutive sample signals produced from one segment along said first path, and means for generating correlation signals by correlating said selected group of sample signals with groups of sample signals produced from a plurality of segments along said first path, whereby the resulting correlation signals are indicative of the spacing along said first path between the transverse bar patterns.

2. The system of claim 1 further comprising conveyor means for transporting the plaid material past said sampling means, and wherein said sampling means includes sensor means for providing signals indicative of received light, said sensor means being disposed so as to receive light reflected from said material.

3. The system of claim 2 wherein said sampling means includes conveyor position sensing means for monitoring the transporting operation of said conveyor means and includes means for sampling the signals produced by said sensor means from light reflected from equally spaced increments along said material, without regard to the constancy of the rate of movement of said material past said sampling means.

4. The system of claim 1 wherein said correlation means includes means for multiplying the signals of each of said groups produced from said plurality of segments by respective signals from said selected group and means for summing the products resulting from the multiplications performed on the signals of each of said groups, whereby said sum signals represent auto-correlation function signals which are indicative of the spacing between the transverse bar patterns.

5. The system of claim 2 wherein said sampling means includes means for translating the center value of the signals produced by said sensor means so that said sensor signals are approximately centered within a preselected range of values.

6. The system of claim 1 further comprising a second sampling means for providing sample signals which are indicative of the light reflectivity from said material at given increments along a second path which is approximately parallel to said first dimension; and
   said correlation means further includes means for generating second correlation signals by correlating said selected group of sample signals produced from said first sampling means with groups of sample signals produced by said second sampling means, whereby said second correlation signals are indicative of the slope of the transverse bar patterns.

7. A system for providing an indication of the spacing between the transverse bar patterns of a plaid material, said system comprising:
   means for providing sample signals which are indicative of the color of said material at given increments along a first path which is substantially parallel to one dimension thereof, said one dimension being non-parallel to said bars; and
   a correlation processor which includes means for selecting a group of consecutive sample signals produced from one segment along said first path, and means for generating auto-correlation signals by correlating said selected group of sample signals with groups of sample signals produced from a plurality of segments along said first path, whereby the resulting auto-correlation function signals are indicative of the spacing along said first path between the transverse bar patterns.

8. The system of claim 7 further comprising conveyor means for transporting the plaid material past said means for providing sampling signals, and wherein said means for providing sampling signals includes sensor means disposed so as to receive light reflected from said material.

9. The system of claim 8, wherein said means for providing sampling signals includes conveyor position sensing means for monitoring the transporting operation of said conveyor means and includes means for sampling the signals produced by said sensor means from light reflected from equally spaced increments along said material without regard to the constancy of the rate or direction of movement of said material.

10. The system of claim 8 wherein said correlation processor includes means for multiplying the signals of each of said groups produced from said plurality of segments by respective signals from said selected group and means for summing the product signals resulting from the multiplications performed on the signals of each of said groups produced from said plurality of segments, whereby said sum signals represent autocorrelation function signals which are indicative of the spacing between the transverse bar patterns.

11. The system of claim 10 wherein said correlation processor includes means for providing said groups of sample signals produced from the plurality of segments along said first path, by storing a preselected number of said sample signals and sequentially updating said stored preselected number of sample signals upon the receipt of each new sample signal by including the last produced sample signal and deleting the sample signal which had been in storage longest.

12. The system of claim 10 wherein said correlation processor includes means for periodically updating said selected group of sample signals with a new group of more recently produced sample signals.

13. A system for providing signals which are indicative of the relative spatial relationship of the generally transverse bars on a plaid material, said system comprising:
a conveyor for transporting the material;
first sampling means, disposed relative to said conveyor so as to receive light reflected from said material, for providing first sample signals which are indicative of the color of said material at given fixed increments along a first path which is substantially parallel to one dimension thereof, said one dimension being approximately orthogonal to the nominal orientation of said bars;
second sampling means, disposed relative to said path so as to receive light reflected from said material, for providing second sample signals which are indicative of the color of said material at given fixed increments along at least a second path which is approximately parallel to said first path; and
a correlation processor which includes means for selecting a group of consecutive sample signals produced from one segment along said first path, and means for generating auto-correlation signals by correlating said selected group of said first sample signals with other groups of said first sample signals and for generating cross-correlation signals by correlating said selected group of first sample signals with groups of said second sample signals; whereby the resulting auto- and cross-correlation functions are indicative of the relative spatial relationship of the generally transverse bars.

14. The system of claim 13 wherein said first and second sampling means include means for translating the center value of the signals produced by each of said sampling means so that said signals are approximately centered within a selected range.

15. The system of claim 13 including conveyor position sensing means for monitoring the transporting operation of said conveyor and means for causing each of said sampling means to sample the signals produced by light reflected from equally spaced increments along said material without regard to constancy of the rate or direction of movement of said material.

16. The system of claim 13 wherein said correlation processor includes means for storing a selected number of said first sample signals and for sequentially forming said other groups of said first sample signal by including the last produced first sample signal and deleting the first sample signal which had been in storage longest, and means for sequentially forming said groups of said second sample signals by including the last produced sample and deleting the second sample signal which had been in storage longest.

17. The system of claim 13 wherein said correlation means includes means for storing and periodically updating said selected group of first sample signals with a new group of more recently produced sample signals.

18. For use with a material having a plurality of bars forming a repetitive pattern thereon such that said bars are substantially orthogonal to one dimension of said material, a system for providing signals indicative of the spacing between the repetitive bar patterns, said system comprising:
means for providing sample signals which are indicative of the bar pattern as sampled at given increments along a first path which is substantially parallel to said one dimension; and
correlation means for generating correlation functions of groups of consecutive sample signals, said correlation means including means for selecting a given group of consecutive sample signals produced from one segment along said first path and using said selected group of consecutive sample signals to compute correlation function signals with other different groups of consecutive sample signals that correspond to contiguous segments along said one dimension, whereby said correlation function signals are definitive of the spacing between repetitive bar patterns.

19. A method for providing signals which are indicative of the spacing between repetitive transverse bar patterns of a plaid material, said method comprising the steps of:
sampling the relative light reflectivity of said material at given increments along a first path which is substantially parallel to one dimension thereof, said one dimension being approximately transverse to said bars;
selecting a group of consecutive sample signals produced from one segment along said first path, and
generating correlation signals by correlating the selected group of sample signals with groups of sample signals produced from a plurality of segments along said first path, whereby the resulting correlation function signals are indicative of the spacing between the transverse bar patterns.

* * * * *